US007286188B2

(12) United States Patent
Chupp et al.

(10) Patent No.: US 7,286,188 B2
(45) Date of Patent: *Oct. 23, 2007

(54) METHOD AND SYSTEM FOR ENHANCED MODULATION OF VIDEO SIGNALS

(75) Inventors: Christopher E. Chupp, St. Louis, MO (US); Michael S. Gramelspacher, St. Louis, MO (US); Jesse J. Chounard, II, Ballwin, MO (US); James G. Withers, Chesterfield, MO (US); Yousri H. Barsoum, St. Louis, MO (US); Michael C. Reynolds, Ballwin, MO (US)

(73) Assignee: Koplar Interactive Systems International, L.L.C., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/465,234

(22) Filed: Aug. 17, 2006

(65) Prior Publication Data

US 2006/0274198 A1 Dec. 7, 2006

Related U.S. Application Data

(63) Continuation of application No. 10/888,919, filed on Jul. 9, 2004, now Pat. No. 7,116,374.

(60) Provisional application No. 60/554,151, filed on Mar. 18, 2004, provisional application No. 60/502,136, filed on Sep. 10, 2003, provisional application No. 60/498,039, filed on Aug. 26, 2003.

(51) Int. Cl.
*H04N 7/08* (2006.01)

(52) U.S. Cl. .................................................... 348/473
(58) Field of Classification Search ................ 348/473, 348/476, 478, 469, 564, 553, 581, 548, 461
See application file for complete search history.

(56) References Cited

U.S. PATENT DOCUMENTS

| 4,454,507 A | 6/1984 | Srinivasan et al. |
| 4,504,852 A | 3/1985 | Ducret |
| 4,807,031 A | 2/1989 | Broughton et al. |
| 4,969,041 A | 11/1990 | O'Grady et al. |
| 5,200,822 A | 4/1993 | Bronfin et al. |
| 5,243,423 A | 9/1993 | DeJean et al. |
| 5,594,493 A | 1/1997 | Nemirofsky |
| 5,691,828 A | 11/1997 | Weiss et al. |
| 5,699,174 A | 12/1997 | Weiss et al. |
| 5,717,697 A | 2/1998 | Yin |
| 5,742,743 A | 4/1998 | Weiss |
| 5,745,596 A | 4/1998 | Jefferson |
| 5,745,604 A | 4/1998 | Rhoads |
| 5,768,426 A | 6/1998 | Rhoads |
| 5,850,481 A | 12/1998 | Rhoads |

(Continued)

*Primary Examiner*—Paulos M. Natnael
(74) *Attorney, Agent, or Firm*—Schwegman, Lundberg & Woessner, P.A.

(57) ABSTRACT

A method, apparatus and system for signal modulation. A plurality of pixels are selected in a pattern such that a first pixel group of the plurality of pixels is unpaired with a second pixel group of the plurality of pixels throughout the pattern in a portion of a video signal. The intensity of the plurality of the pixels is altered at a constant magnitude in the portion of the video signal pursuant to the pattern in a substantially invisible way.

26 Claims, 29 Drawing Sheets

U.S. PATENT DOCUMENTS

| | | |
|---|---|---|
| 5,852,429 A | 12/1998 | Scheffer et al. |
| 5,960,081 A | 9/1999 | Vynne et al. |
| 6,044,182 A | 3/2000 | Daly et al. |
| 6,045,515 A | 4/2000 | Lawton |
| 6,061,094 A | 5/2000 | Maietta |
| 6,094,228 A | 7/2000 | Ciardullo et al. |
| 6,122,392 A | 9/2000 | Rhoads |
| 6,229,572 B1 | 5/2001 | Ciardullo et al. |
| 6,232,955 B1 | 5/2001 | Guttag et al. |
| 6,266,430 B1 | 7/2001 | Rhoads |
| 6,370,272 B1 | 4/2002 | Shimizu |
| 6,400,827 B1 | 6/2002 | Rhoads |
| 6,404,898 B1 | 6/2002 | Rhoads |
| 6,449,379 B1 | 9/2002 | Rhoads |
| 6,512,835 B1 | 1/2003 | Numao et al. |
| 6,647,129 B2 | 11/2003 | Rhoads |
| 6,661,905 B1 | 12/2003 | Chupp et al. |
| 6,674,876 B1 | 1/2004 | Hannigan et al. |
| 6,778,682 B2 | 8/2004 | Rhoads |
| 6,842,160 B2 | 1/2005 | Yamazaki et al. |
| 7,116,374 B2 * | 10/2006 | Chupp et al. ............... 348/473 |
| 7,167,209 B2 * | 1/2007 | Cookson et al. ............ 348/473 |
| 2002/0089473 A1 | 7/2002 | Yamazaki et al. |
| 2002/0112250 A1 | 8/2002 | Koplar et al. |
| 2002/0183102 A1 | 12/2002 | Withers et al. |
| 2005/0024536 A1 | 2/2005 | Cookson et al. |
| 2005/0083436 A1 | 4/2005 | Reynolds et al. |
| 2005/0195327 A1 | 9/2005 | Chupp et al. |

* cited by examiner

ENCODER FIG. 3

ALT DETECTION METHOD I

METHOD AND SYSTEM FOR ENHANCED MODULATION OF VIDEO SIGNALS

CROSS-REFERENCE TO RELATED APPLICATIONS

This application is a Continuation of U.S. application Ser. No. 10/888,919, filed Jul. 9, 2004, now U.S. Pat. No. 7,116,374, which claims the benefit of U.S. Provisional Patent Application entitled "Method and System for Spread Spectrum Frequency Modulation of Video Signals", Ser. No. 60/498,039, Filed 26 Aug. 2003; U.S. Provisional Patent Application entitled "Method and System for Detection of Carrier Signals Within Video Signals by Magnitude Changes", Ser. No. 60/502,136, Filed 10 Sep. 2003; and U.S. Provisional Patent Application entitled "Method and System for Video Signal Image Analysis", Ser. No. 60/554,151, Filed 18 Mar. 2004, all of which are herein incorporated by reference.

BACKGROUND

The present invention relates to a method for encoding and detecting a carrier signal in a video signal for signaling purposes, and more particularly to methods and apparatus for determining an optimum level and placement of a carrier signal to be modulated into an active portion of a video signal so as to deter nefarious third parties from stripping the carrier signal out of the video signal and increase the detectability of the carrier signal within the video signal without noticeably decreasing the clarity of a picture represented by video signal to a viewer.

Various methods exist in the art for transmitting a carrier (or subcarrier) signal along with video signals, wherein the carrier signal is used for a variety of signaling purposes. Several of these methods transmit the carrier signals, such as in the form of auxiliary data, in the video signals by replacing active portions of the video signal with auxiliary data, such that users who view the video signal on their display devices (e.g., televisions) will see the effect of the carrier signal in the form of an icon, dot or other visual image or disturbance in the picture. Other methods transmit carrier signals in non-viewable scan lines of the video signal, such as in the vertical blanking interval (VBI). However, these scan lines may already contain other carrier signals such as signals that represent cueing information, timing information or closed captioning information and are prone to being stripped by programming operators prior to broadcast.

Another method for transmitting a carrier signal in video signals is described in U.S. Pat. No. 4,807,031 to Broughton et al. ("Broughton") entitled "Interactive Video Method and Apparatus", which relates generally to in-band video broadcasting of commands and other encoded information to interactive devices and is incorporated by reference herein. The invention described therein relates generally to interactive educational and entertainment systems, and is described in one embodiment in the context of television program control of toys located where there is a television receiver, as within a residence.

To encode control data, Broughton discloses a novel method of luminance or chrominance modulation of a video signal that creates a composite video signal, wherein the video signal is modulated with control data. The novel modulation method alternately raises and lowers the luminance/chrominance of paired adjacent horizontal scan lines to create a video subcarrier that contains the control data.

In Broughton, the video signal is not being replaced with other data, nor is the data being added as a separate signal along with the video signal. Rather, the video signal itself is modulated to carry the control data. Therefore, the control data is a part of, or contained within, the video signal and yet is imperceptible to the human eye. The encoding method also includes preview and remove circuitry to ensure suitability or the presence of data encoding and removal of data encoding, respectively.

The control data is transmitted either by television broadcast means, or by pre-recorded video players that are connected to a video display. The control data is then received by the video display where at least one video field of the video display is modulated by control data. The control data is then detected with either opto-electronic or radio frequency (RF) detection means that discriminate between the program material and the control data to detect the control data. The detected control data is further reproduced so that the control data can be used with an interactive device.

Improvements on the method of modulation described in Broughton are described in U.S. Pat. No. 6,094,228 to Ciardullo et al. and U.S. Pat. No. 6,229,572 to Ciardullo et al. (referred to collectively herein as "Ciardullo"). Both Ciardullo patents describe improved methods of signal modulation wherein the auxiliary data is inserted within the visual portion of a video signal by changing the luminance of paired scan lines in opposite directions. Instead of raising and lowering the intensity on the whole line as in Broughton, Ciardullo uses pseudo noise sequences to raise and lower the intensity on portions of a first line, where the line paired to the first line is modulated with the inverse pseudo noise sequences. Ciardullo thereby allows larger amounts of auxiliary data to be modulated in the video signal by use of the pseudo noise sequences. Ciardullo, which is owned by the assignee of the present invention, is incorporated by reference herein.

Improvements in the method of modulating data in the active portion of the video signal are disclosed in U.S. Pat. No. 6,661,905 to Chupp et al. (hereinafter "Chupp"). Chupp discloses a method of superimposing data on the visible portion of a video signal comprising the steps of analyzing an image defined by a video signal and forms of pixels to identify a data carrying parameter associated with each pixel, developing a chip characteristic table having digital values that represent the amplitudes of respective chips to be superimposed on the video signal at corresponding positions, each chip having a varying characteristic determined by the parameter combining the video signals with the chips using the derived chip amplitudes into a composite signal, and transmitting the composite video signal. Chupp is also owned by the assignee of the present invention and is incorporated by reference herein.

At the time of the present invention, analog display devices (e.g., NTSC televisions) operate by use of a fine pitch electron beam that strikes phosphors coating on an internal face of the cathode ray tube (CRT). The phosphors emit light of an intensity which is a function of the intensity of the beam striking it. A period of 1/60 second is required for the electron beam to completely scan down the CRT face to display a field of the image. During the following 1/60 second, an interlaced field is scanned, and a complete frame of video is then visible on the analog display device. The phosphors coating on the face of the tube is chemically treated to retain its light emitting properties for a short duration. Thus, the first area of the scanned picture begins to fade just as the electron beam retraces (i.e., during the vertical retrace) to the top of the screen to refresh it. Since the electron beam covers 525 lines 30 times per second, a total of 15,750 lines per second is viewed each second.

Broughton's method of encoding a carrier signal in a video signal and its improvements were generally intended for use with an analog display device. Upon receiving the video signal from the signal source, such a display device splits the video signal into sequentially transmitted images referred to as frames, whereby each frame of an NTSC television image has 525 horizontal scan lines. The display device scans 262.5 of the horizontal lines left to right and top to bottom by skipping every other line, thus completing the scan of a first field, and then retracing to the top of the image and scanning the remaining 262.5 lines, for a second field. The fields are interlaced at the display device and construct one complete frame. When the video signal is broadcast at 525 lines per frame and 30 frames a second there are 60 fields per second and a line frequency rate (i.e., the speed at which lines are refreshed) of 15,750 Hz (i.e., approximately 16 kHz).

The use of Broughton and other methods of encoding carrier signals may not be sufficiently robust for embodiments where there is a possibility that the carrier signal will be detected, altered or removed by an unauthorized party. Under Broughton, the unauthorized party may detect the frequency at which carrier signal is present and use an electronic device to strip out the carrier signal while substantially preserving the video signal. The detection, removal or alternation of the carrier signal may provide the unauthorized party with additional benefits or access to which the party would not otherwise be entitled, such as when the carrier signal is used to restrict unauthorized reproduction of the video signal.

The possibility of unauthorized detection, removal or alternation of carrier signals may be reduced under the present invention by spreading the resulting encoding frequency over a spectrum. Generally, spread spectrum technology is used with wireless communications in which the frequency of a transmitted signal is deliberately varied. The signal is thus transmitted over a greater bandwidth than if the signal did not have its frequency varied. Thereby, the signal is less likely to be disrupted if there is a significant amount of interference at a particular frequency. In addition, the spreading of the spectrum from a single frequency to multiple frequencies dramatically increases the difficulty of an unauthorized party interfering with or intercepting the carrier signal.

Since there is a frequency generated by adding the carrier signal to the video scan lines in a regular pattern, it is desirable to vary the locations and levels by which the intensity of the video signal is altered so that the resulting frequencies from modulating the video signal will occur over a wide range. Accordingly, there is a need in the art to modulate a video signal with a carrier signal over a spread spectrum wherein the presence of the carrier signal is detectable without paired lines, such that it is difficult to remove the carrier signal from the video signal without rendering the video signal unwatchable and the resulting picture distorted.

Although Broughton and its improvements have been frequently used and well received since their inception, the relative invisibility of the carrier signal in the picture of the display device and the ease of detecting the carrier signal by a detector or from the display device by a hand-held device can be yet improved. A slight tendency to visibility of the carrier signal in the active portion of the video signal may occur when the voltage of the carrier signal is increased for the purpose of increasing the carrier signal's detectability, as television viewers might then slightly perceive the effects of the carrier signal on the visible picture, such as a slight tendency of visible lines or a slight deterioration in the picture quality. Since one of the advantages of using Broughton is its invisibility to the human eyesight, any tendency of viewing the effects of the carrier signal is undesirable.

The invisibility challenge is typically resolved by reducing the voltage (i.e., as resultant luminosity) added to or removed from the selected video scan lines. However, lowering the overall signal intensity decreases the reliability of detecting the carrier signal. Despite the success of the technology of Broughton and its improvements, wherein the modulation of video with carrier signals results in at no worse than subliminal visual changes which are substantially invisible, there is a need in the art for a new method and system for modulating a video signal with a carrier signal wherein the signal is even more completely invisible and yet more reliably detected.

Modulated video signals are subject to tampering as the signal may be resized or otherwise altered such that the video signal is de-interlaced. When the video signal is re-interlaced, it may become altered such that the line to line differences between a first and a second field may be read erroneously by a detector such that the carrier signal is shifted so that it is no longer on the desired lines or is on undesirable lines. The detection, removal or alternation of carrier signals may provide the unauthorized party with additional benefits or access to which the party would not otherwise be entitled. Accordingly, there is a need in the art to modulate a video signal with a carrier signal wherein the presence of the carrier signal is also detectable by detecting the magnitude of line to line differences in a field of a video signal.

SUMMARY

The following improvements for modulating a video signal with a carrier signal improve upon the methods and apparatus previously disclosed in Broughton, Ciardullo and Chupp. The present invention relates to methods and apparatus for optimizing a carrier signal to be inserted in an active portion of a video signal so as to increase the detectability of the carrier signal without noticeably increasing the alteration of the video signal to a viewer.

A video signal is first transmitted from a signal source to an encoder. An operator interacts with the encoder to control its operation, and thereafter the carrier signal is then selectively encoded by the encoder in the video signal over a time interval for signaling purposes, such as to signal an absence or presence (i.e., of the carrier signal) for desired durations in the video signal. Upon modulating the video signal, the encoder produces a modulated video signal comprised of the video signal and the carrier signal. The modulated video signal is then provided to a broadcast source for distribution to an end-user ("viewer") who will view the program.

The method of encoding the carrier signal within the video signal first comprises an encoder obtaining the video signal from a signal source. The encoder thereafter generates a three dimensional matrix consisting of signal hiding parameters. The three dimensional matrix consists of a plurality of two dimensional sub-matrices each of which corresponds to a particular hiding technique used with the present invention. A hiding technique is a method by which a computed amount of intensity may be added to particular pixels in video signal without noticeably altering the picture of video signal. Each of the sub-matrices of the three dimensional signal hiding matrix contains a table of parameters with values that directly correspond to similarly positioned pixels of a frame of video signal. Once the three dimensional signal hiding matrix is generated, the three dimensional signal hiding matrix is transformed into a two dimensional signal hiding matrix.

The encoder also generates a three dimensional matrix consisting of limiting parameters. The three dimensional limiting matrix consists of one or more two dimensional limiting sub-matrices, with each sub-matrix containing a number of values that correlate with the pixels of a frame of the video signal and indicate the maximum amount of intensity that may be added to the corresponding pixel of the video signal based on a particular limiting technique. Thereafter, the encoder transforms the three dimensional limiting matrix into a two dimensional limiting matrix.

Once the generation and transforming of the signal hiding matrix and limiting matrix is complete, the encoder compares the signal hiding matrix with the limiting matrix to create a real encoding value matrix. The real encoding value matrix contains the maximum values of the two dimensional signal hiding matrix subject to the ceiling (i.e., maximum permissible value) of the two dimensional limiting matrix. The encoder then adjusts the real encoding value matrix by comparing its current values against a base line value to ensure that a minimal level of signal is added to portions of the video signal where needed.

The encoder thereafter applies the direction of the carrier signal to the magnitude of the values in the real encoding value matrix. Upon completion, the encoder applies the values of the real encoding value matrix to the video signal according to a video modulation technique.

A broadcast source of the end user provides a modulated video signal to a decoder. The decoder determines whether a carrier signal is present in the modulated video signal over a time interval and responds according to the desired application in which the decoder is used.

Additional advantages and novel features of the invention will be set forth in the description which follows, and will become apparent to those skilled in the art upon examination of the following more detailed description and drawings in which like elements of the invention are similarly numbered throughout.

DETAILED DESCRIPTION OF EMBODIMENTS OF THE INVENTION

Figure 1:
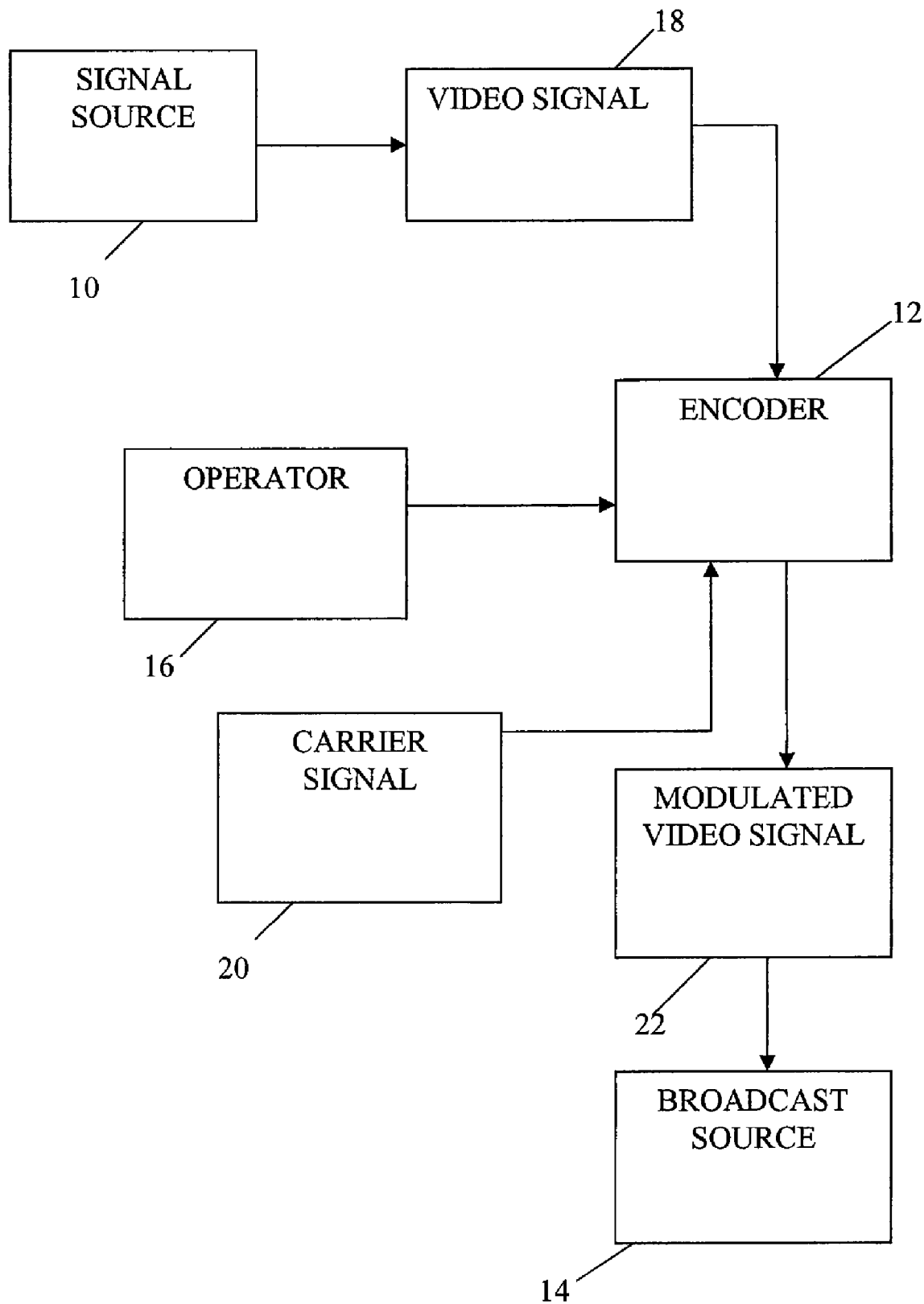
FIG. 1 is a first example flowchart of an encoding method.

Referring to the drawings, a method, apparatus and system for optimal modulation of a carrier signal within an active portion of a video signal in a manner that the carrier signal cannot be easily stripped and the detectability of the carrier signal is increased without noticeably increasing the alteration of the video signal to a viewer is illustrated in FIGS. 1-29.

Referring to FIG. 1, a video signal 18 is transmitted from a signal source 10 to an encoder 12. Video signal 18 is preferably an analog video signal in NTSC (National Television Standards Committee) format, but may be other video signals or video signal formats compatible with the present invention. Signal source 10 is typically a professional grade video tape player with a video tape containing a video program, but may also be other sources of video including a camcorder or a digital versatile disc (DVD) player with a DVD video containing a video program. Encoder 12 is described in greater detail below.

Operator 16 interacts with encoder 12 to control operation of encoder 12. Preferably, operator 16 is a person that interacts with encoder 12 through the use of a computer or other electronic control device. However, operator 16 may consistent entirely of a computer or other electronic control device that directs operation of encoder 12 in an automated manner.

A carrier signal 20 is selectively modulated within video signal 18 by encoder 12 in over a time interval by operator 16 for signaling purposes, such as to indicate a signal presence or signal absence for desired durations in the video signal 18. Upon modulating video signal 18, encoder 12 outputs a modulated video signal 22 comprised of video signal 18 and carrier signal 20. The process of modulating video signals 18 is described in greater detail below.

Modulated video signal 22 is then provided to a broadcast source 14 for distribution to an end-user who will view the video program. Broadcast source 14 is preferably DVD media or other digital storage media that is provided to one or more end users, but also may be other media sources including video tapes, television broadcast stations, cable or satellite sources or wireless sources that broadcast programs.

Figure 2:
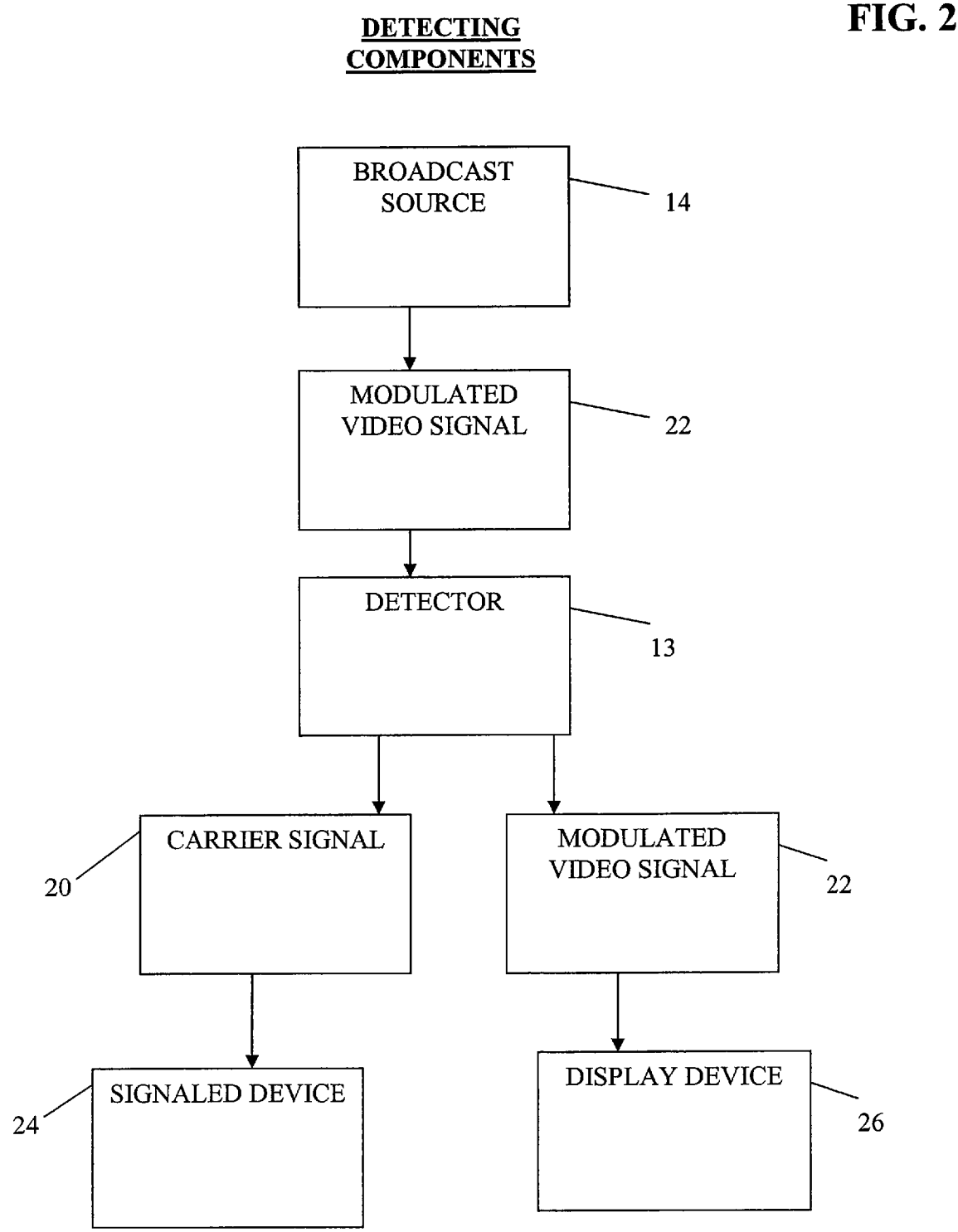
FIG. 2 is a first example flowchart of a decoding method.

Referring to FIG. 2, broadcast source 14 provides modulated video signal 22 to a detector 13. As discussed in greater detail below, detector 13 determines whether a carrier signal 20 is present in modulated video signal 22 preferably by the number of line to line differences over a number of consecutive fields of video signal 18 during a time interval (e.g., a set number of fields or frames, clock ticks, or seconds.) If carrier signal 20 is present, detector 13 provides indication of the presence of carrier signal 20 to a signaled device 24 by providing it with a signal presence. If carrier signal 20 is determined not to be present during the time interval, decoder 22 transmits a signal absence. Signaled device 24 is preferably any device which is capable of receiving and utilizing one or more signal absences (e.g., carrier signal 20 not present) and signal presences (e.g., carrier signal 20 present), such as a digital video recorder that uses the absences and presences to flag the checking of permissions to enable playback or recording of a video program.

Detector 13 provides modulated video signal 22 to a display device 26. Display device 26 is preferably a digital video recorder, but may also be other devices capable of presenting and/or recording video signals 18 such as an analog or digital television. Display device 26 and signaled device 24 may be combined into a signal unit.

Figure 3:
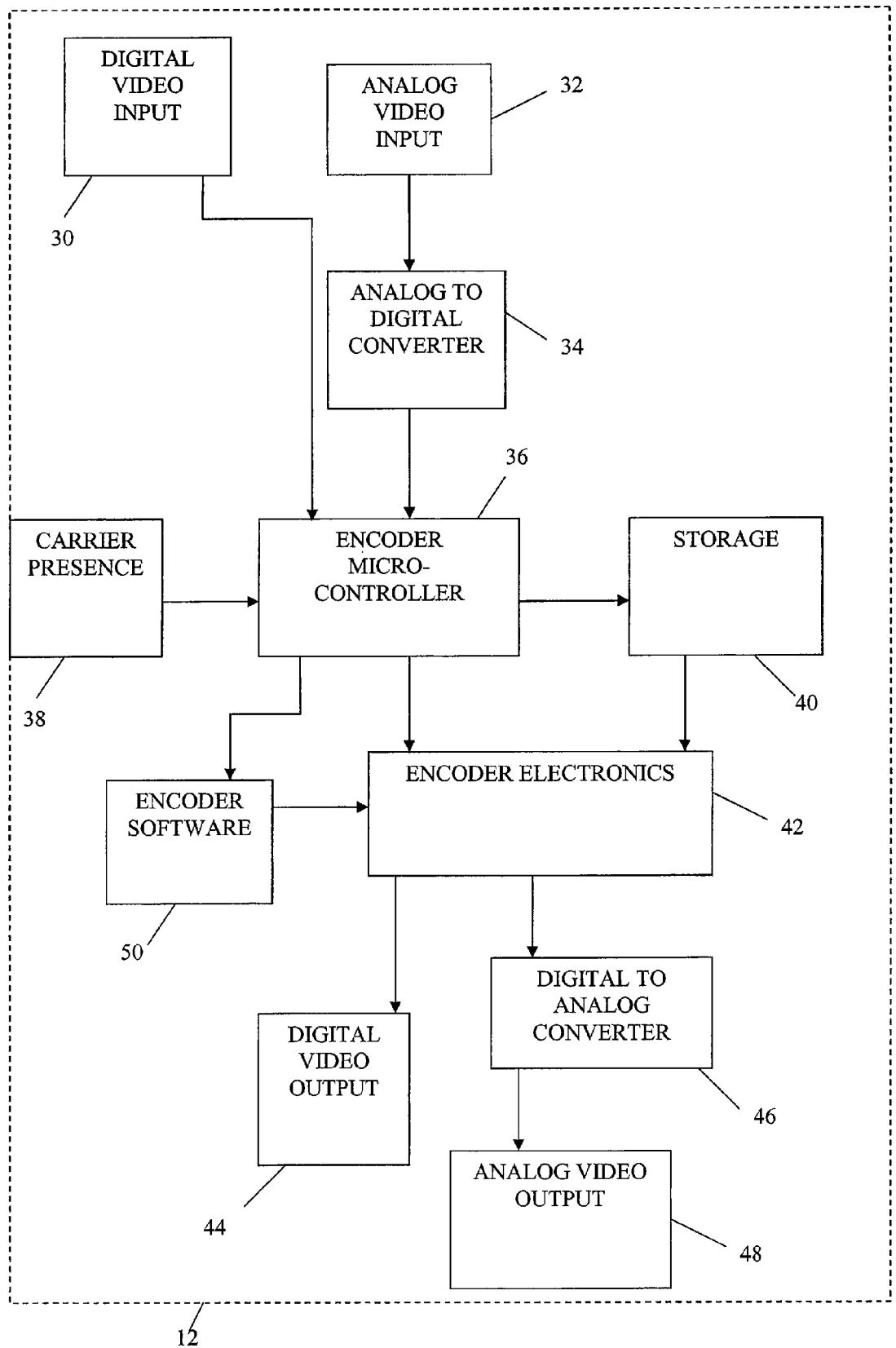
FIG. 3 is a block diagram of an example encoder.

Referring to FIG. 3, the preferred embodiment of encoder 12 is shown to first comprise a digital video input 30 that is capable of receiving video signal 18 from signal source 10 and passing it to encoder micro-controller 36. However, encoder 12 may receive an analog video signal 18 via analog video input 32 and analog to digital converter 34. Analog to digital converter 34 digitizes the analog video signal 18 according to known techniques such that it may be provided to encoder micro-controller 36 for use with the present invention.

Encoder micro-controller 36 is electronically connected to a carrier presence 38, which provides encoder micro-controller 36 with the timing of where, when and at what intensity encoder 12 should selectively raise and lower the intensity of scan lines of video signal 18 or portions thereof at the direction of operator 16. Preferably, such instructions are received by carrier presence 38 via a serial port. However it should appreciated in the art of computer hardware that other device interconnects of encoder 12 are contemplated including via universal serial bus (USB), "Firewire" protocol (IEEE 1394), and various wireless protocols. In an alternate embodiment, carrier presence 38 may be an operator interface so that operator 16 can directly interface with encoder 12. In a further alternate embodiment, carrier presence 38 may be implemented by and made integral with encoder software 50.

When encoder micro-controller 36 receives information from carrier presence 38 and video signal 18, software 50 manages further operation of encoder 12 and directs encoder micro-controller 36 to store the chrominance information (and/or luminance information as desired) of video signal 18 in storage 40. Storage 40 has the capacity to hold and retain signals (e.g., frames of video signal 18 and corresponding audio signals) in an electromagnetic form for access by a computer processor. Storage 40 may be primary storage and/or secondary storage, and include memory and hard disk drive.

Encoder electronics 42 at the direction of software 50 and encoder micro-controller 36 uses the methods of the present invention as will be described in greater detail below to modulate carrier signal 20 into the luminance of video signal 18 thereby creating modulated video signal 22. The resulting modulated video signal 22 is then sent digitally from encoder 12 by digital video output 44, or in analog form by converting the resulting digital signal with digital to analog converter 46 and outputting modulated video signal 22 by analog video output 48. However, it should be appreciated that encoder 12 (and detector 13 as described below) need not comprise both digital video input 30 and digital video output 44 in combination with analog video input 32 and analog video output 48, and the one selection of inputs and outputs may be selected for encoder 13.

Encoder micro-controller 36 may consist of more than one processor and/or microprocessor to manage the various processing and input/output of the present invention, but preferably consists of a single processor. Moreover, the specific electronics and software used by encoder 12 may differ when its technology is included in a pre-existing device such as opposed to a stand alone device custom device. Encoder 12 may comprise varying degrees of hardware and software, as various components may interchangeably be used.

Figure 4:
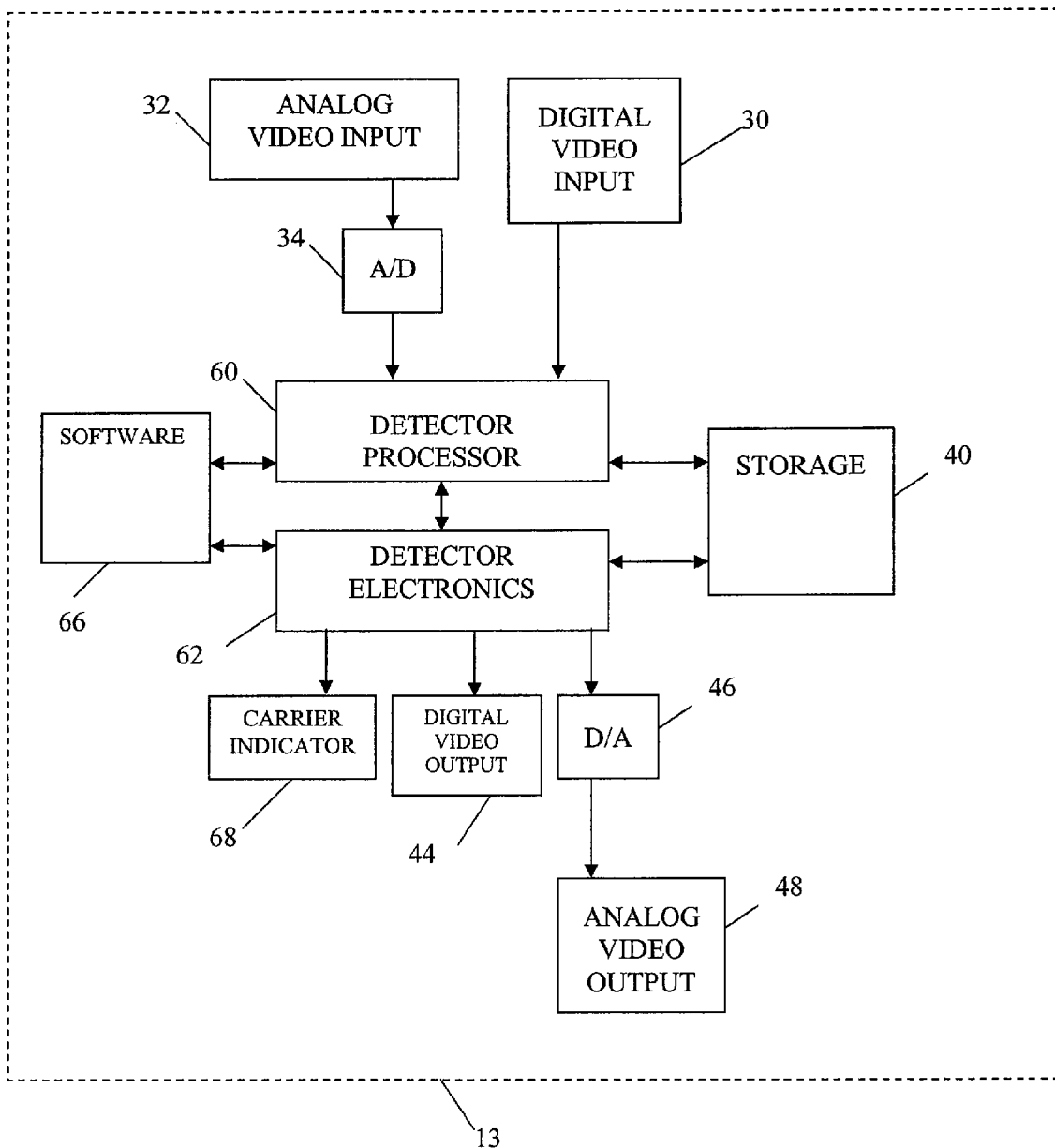
FIG. 4 is a block diagram of an example decoder.

Referring to FIG. 4, detector 13 receives modulated video signal 22 by analog video input 32 when signal 22 is analog, and by digital video input 30 when signal 22 is digital. Digital video input 30 directly passes modulated video signal 22 to detector processor 60, while analog video input 32 digitizes modulated video signal 28 by use of analog to digital converter 34 before passing modulated video signal 22 to detector processor 60.

In the preferred embodiment, detector processor 60 stores the chrominance of modulated video signal 22 in storage 40 while detector electronics 62 detects scan lines or portions of modulated video signal 22 thereof that have increased or decreased intensity. The preferred embodiment of the detection scheme used with the present invention is described below.

Signal presences and signal absences are transferred from detector 13 to signaled device 24 by carrier indicator 68. Detector 13 also outputs modulated video signal 22 in digital format via digital video output 44, and modulated video signal 22 in analog format by first converting signal 22 from the digital to analog format by use of digital to analog converter 46, and then outputting signal 22 via analog video output 48.

Figure 5:
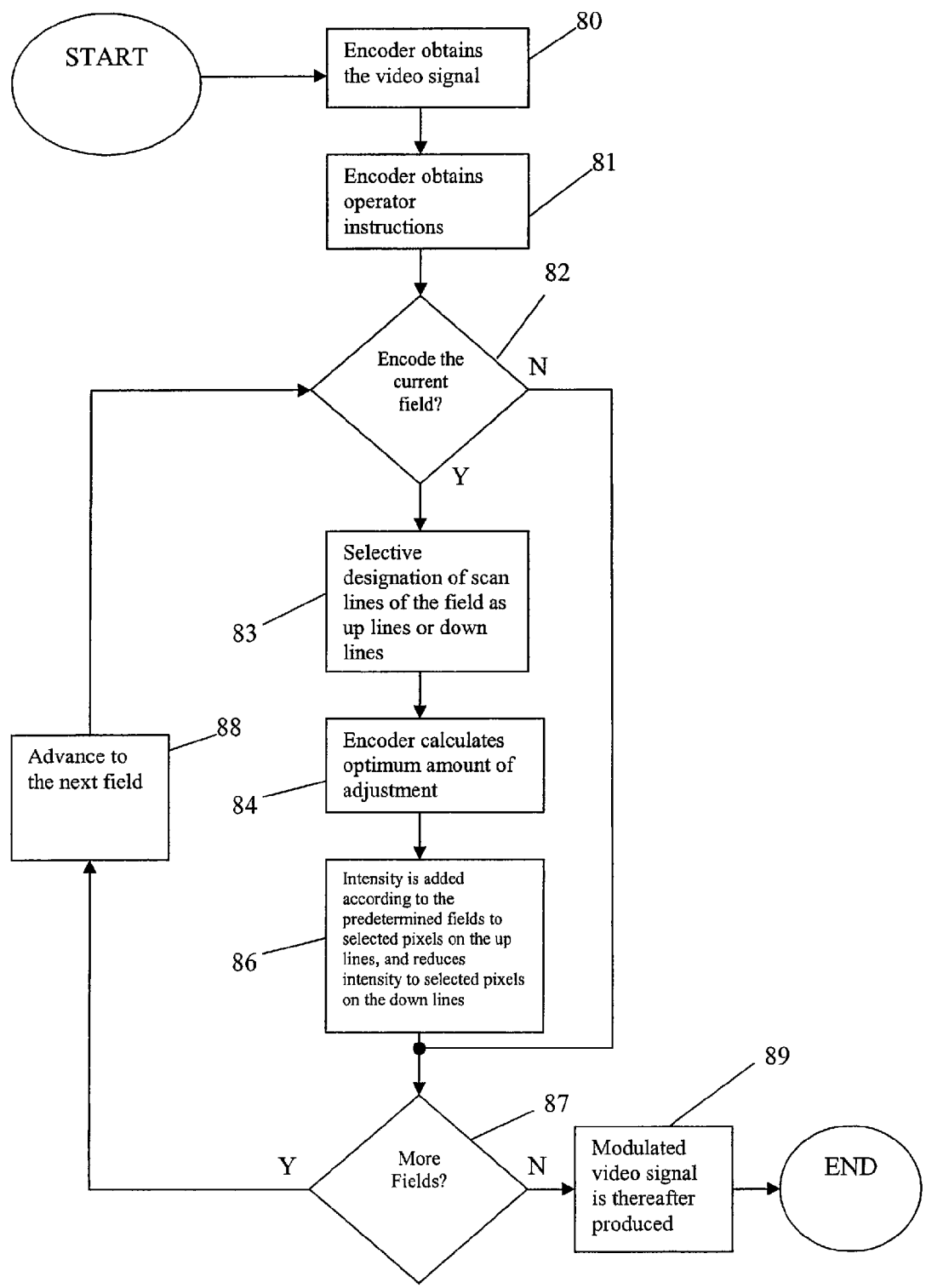
FIG. 5 is a second flowchart of an example encoding method.

Referring to FIG. 5, the general encoding method of the present invention comprises a first step 80 where encoder 12 obtains video signal 18 from signal source 10. Thereafter, operator 16 at step 81 directs encoder 12 to modulate one or more of the fields of video signal 18 during a time interval, and such directions are received by encoder 12 through carrier presence 38. Preferably, a number of consecutive first fields in consecutive frames of video signal 18 are encoded, with the second fields in the frames of video signal 18 left unencoded. However, it be appreciated that by use of the term "first field" as utilized with respect to the present invention, such field may be the first original field or the second interlaced field of the frame of video signal 18, with the term "second field" being the other field. In addition, the use of the terms "first field" and "second field" may refer to a subsection of the fields of video signal 18, such that not all scan lines but a plurality of scan lines of the fields are referred to as "first field" and "second field".

Encoder 12 at decision point 82 determines if encoder 12 is to encode the current field of video signal 18 based on the previously received operator instructions. If no, encoder 12 skips the current field and proceeds to decision point 87. If yes, encoder 12 at step 83 designates scan lines of a first field of video signal 18 as up lines or down lines, such that up lines may only have the intensity of its pixels increased and down lines may only have the intensity of its pixels decreased as described in greater detail below. Thereafter, encoder 12 at step 84 calculates the optimum amount of pixel adjustment as described in greater detail below.

Encoder 12 at step 86 adds intensity to selected pixels on the up lines and reduces intensity to selected pixels on the down lines, the process of which is described in greater detail below. Upon completion, encoder 12 at decision point 87 determines whether there are remaining fields of video signal to analyze. If yes, encoder 12 advances to the next field in video signal 18 at step 88 and returns to decision point 82. If no, encoder 12 at step 89 provides the resulting modulated video signal 22 to broadcast source 14.

Unlike Broughton and Ciardullo, encoder 12 during the foregoing encoding process preferably does need not to pair the scan lines of video signal 18 for encoded fields such that the scan lines are in a high/low configuration (e.g., a first line has increased intensity, a second line has decreased intensity, a third line has increased intensity, a fourth line has decreased intensity, and so on throughout the modulated field) throughout the entire field. Rather, an irregular configuration of the scan lines in a field containing a significant amount of high/low or low/high changes in adjacent scan lines creates sufficient line to line differences such that detector 13 will recognize the presence of carrier signal 20 in modulated video signal 22 while not resulting in frequencies that are easily detected by an unauthorized device. For example, under the present invention detector 13 recognizes a modulated field having two consecutive scan lines with increased intensity, one scan line with decreased intensity, one scan line with increased intensity, and two more scan lines with decreased intensity. Preferably, the scan lines are not in the high/low configuration throughout the field as further described in detail below.

A line to line difference signifies that there is a noticeable amount of added intensity present in a pair of adjacent scan lines in a field, and with the present invention every scan line is preferably not paired throughout the field. The ability to detect such line to line differences is enhanced when the voltage is increased on lines and decreased on lines that are adjacent to each other, such that the resulting comparison of the scan lines reveals an unnatural change in overall intensity between two adjacent scan lines. Although the natural appearance of the video program presented by video signal 18 may provide a limited amount of signal differences, this amount is effectively removed from visibility by comparing a first field to a second unmodulated field.

Figure 6:
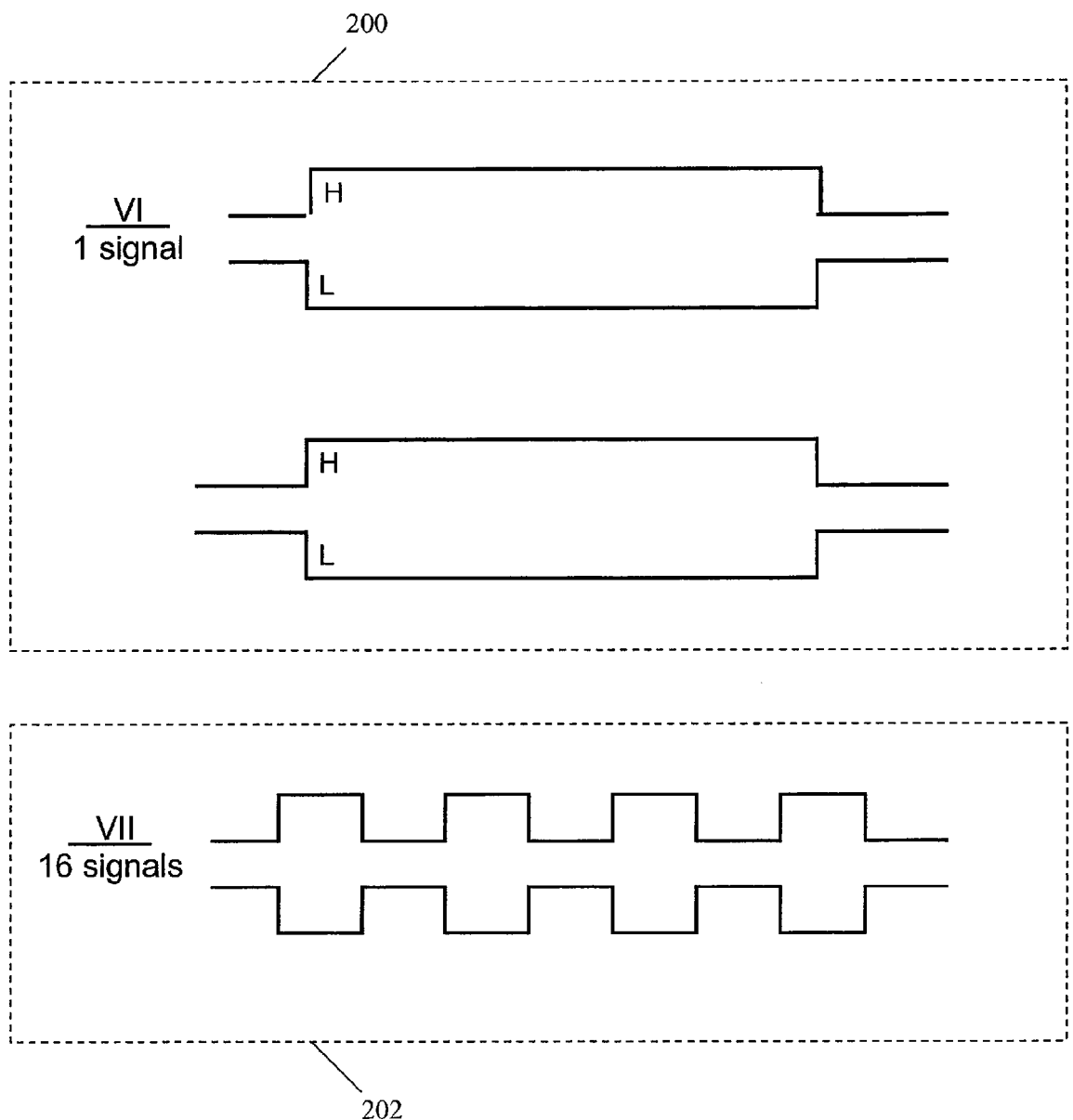
FIG. 6 is a first timing diagram of prior art.

Referring to FIG. 6, a first picture 200 is shown to comprise four scan lines of modulated video signal 22 encoded with the method described by Broughton in the high/low arrangement. As shown in a second picture 202, two scan lines of modulated video signal 22 are encoded with the method described by Ciardullo and shown in a chip pattern arrangement. The present invention preferably does not raise and lower the intensity of an entire scan line as in Broughton, nor does it use the chip patterns of Ciardullo. Instead, the present invention selectively adds or removes intensity to various pixels in a scan line as described in greater detail below. The absence of paired scan lines throughout the field and the use of a varied pattern of high and low changes generates various frequencies that cannot be detected or removed with a single filter.

Figure 7:
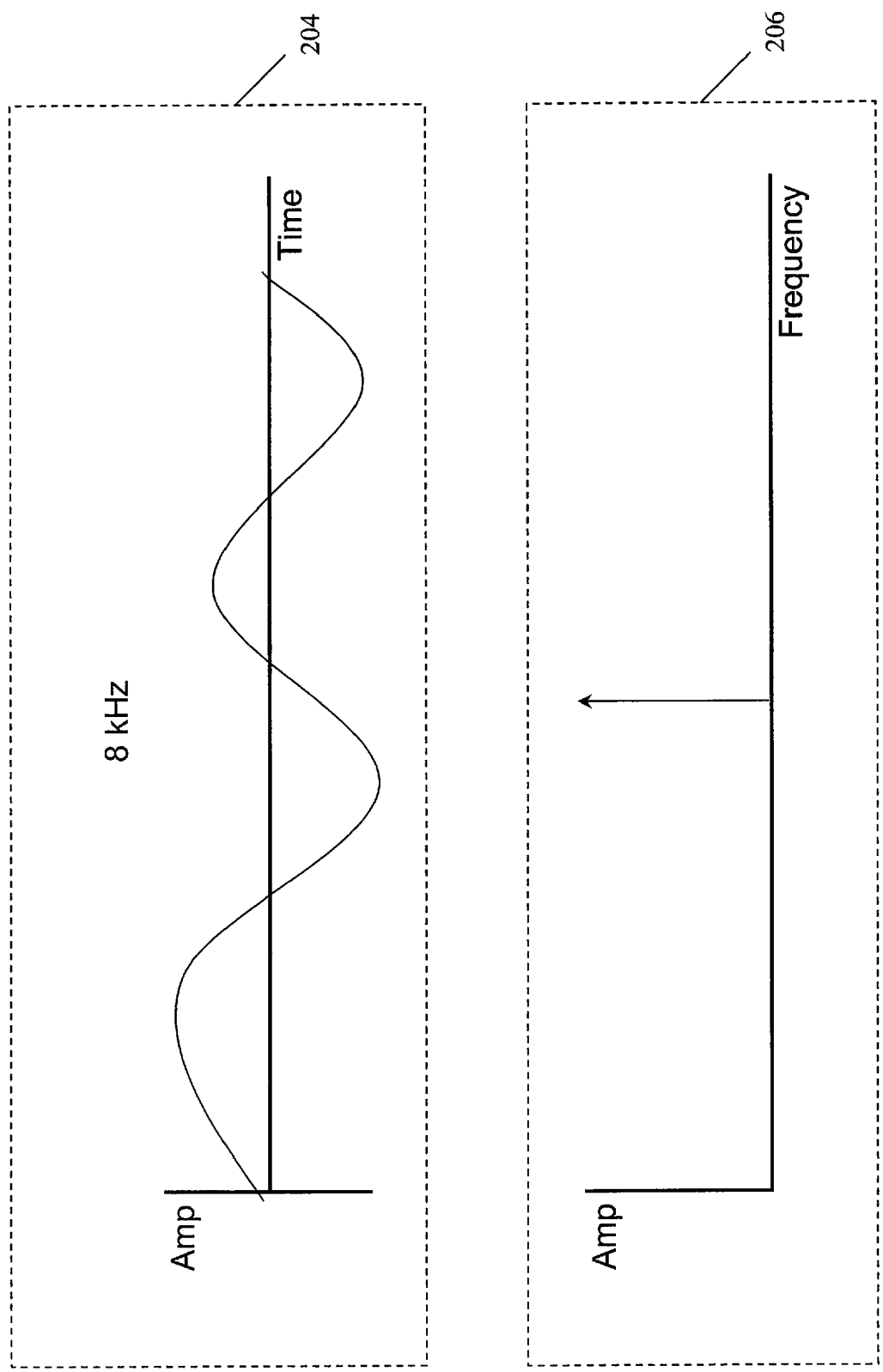
FIG. 7 is a timing diagram for an 8 kHz signal.

Referring to FIG. 7, the result of Broughton's modulation of paired scan lines in a field of modulated video signal 22 is a consistent 8 kHz video signal as shown in a first picture 204 generates a signal frequency as shown in a second picture 206 which may be detected by use of a filter.

Figure 8:
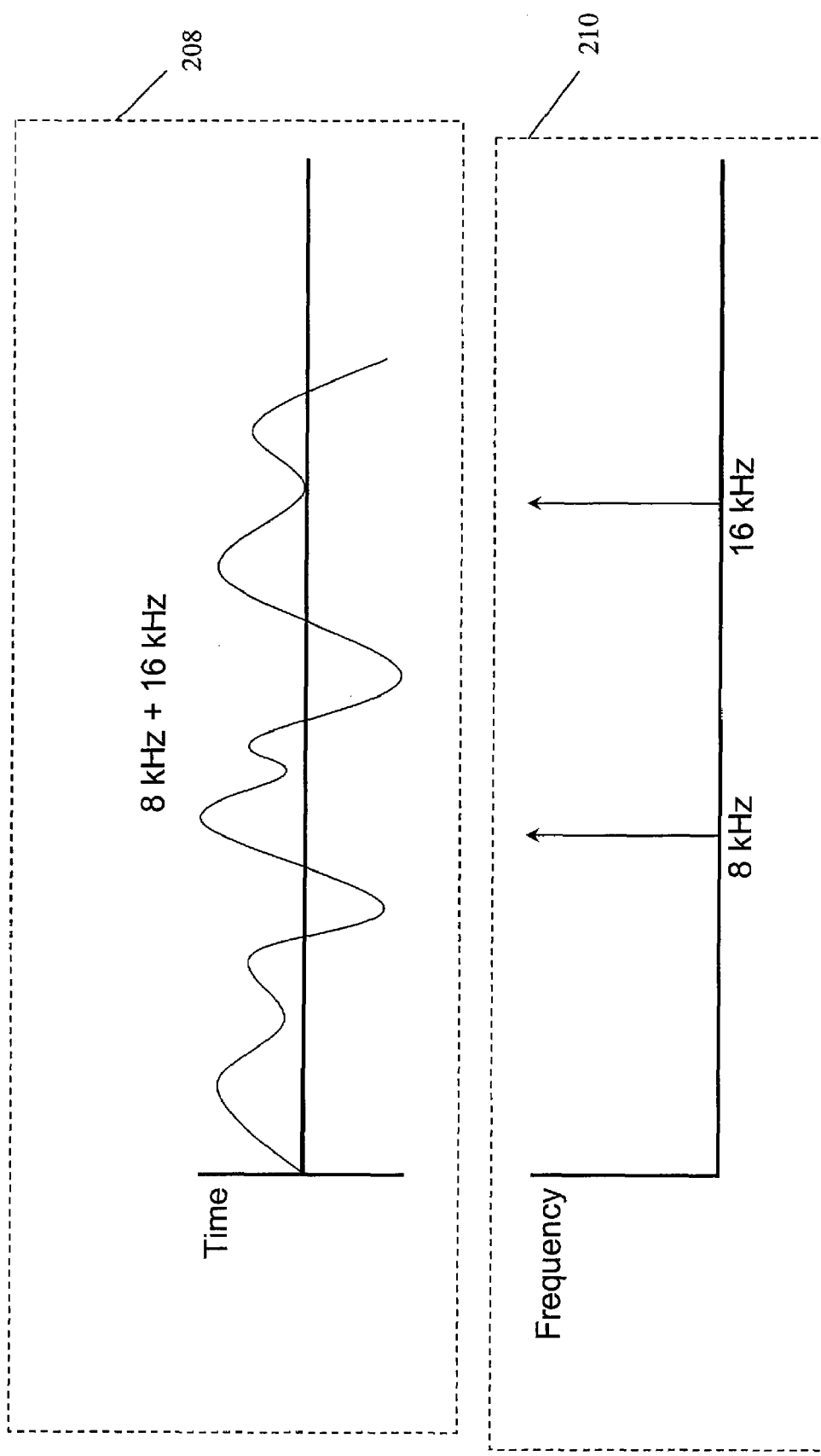
FIG. 8 is a timing diagram for an 8 kHz and a 16 kHz signal.
Figure 9:
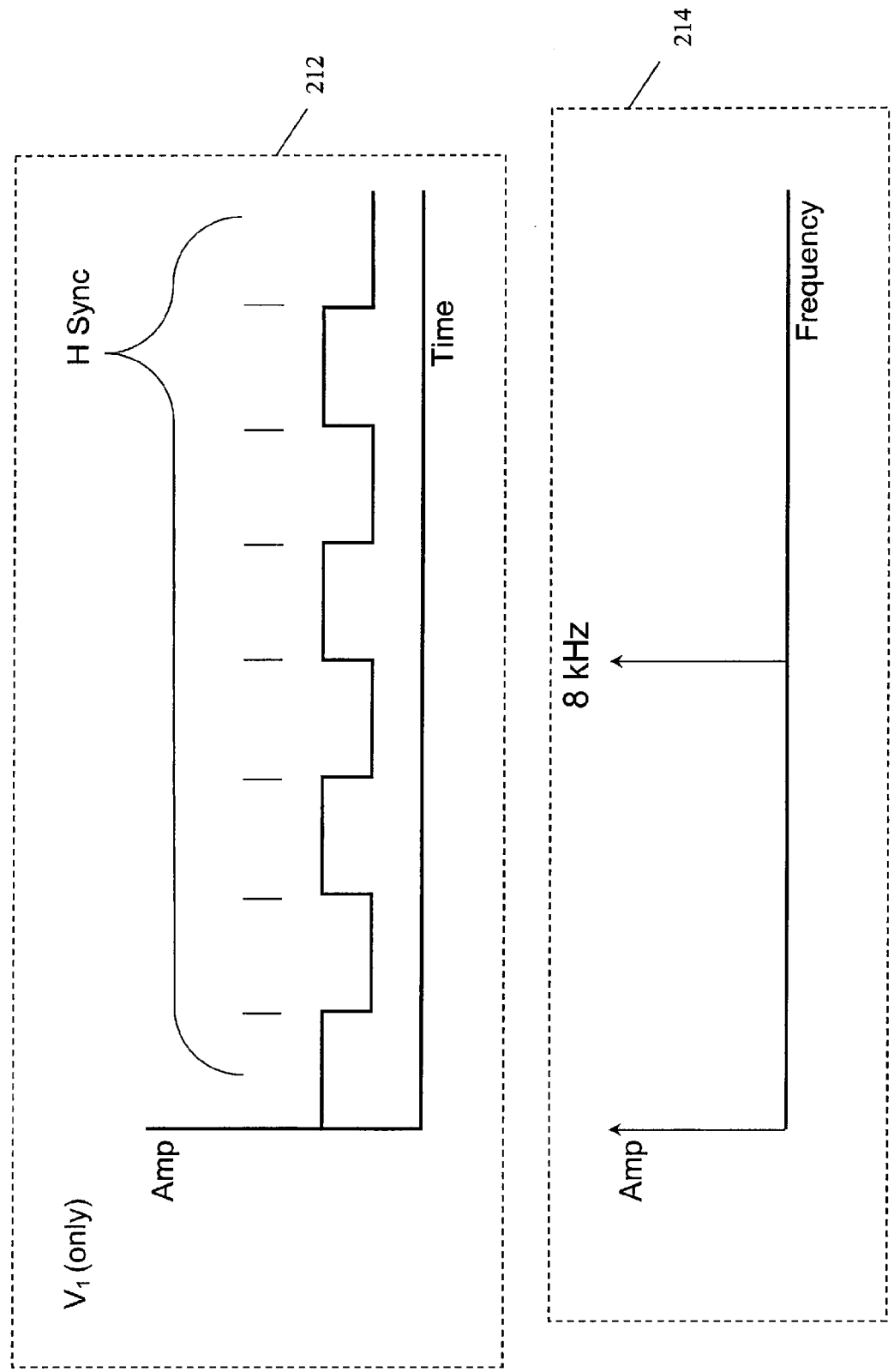
FIG. 9 is a second timing diagram of prior art.

Referring to FIG. 8, the addition of a second frequency such as a 16 kHz signal to the 8 kHz signal in Broughton as shown in a first picture 208 spreads the spectrum so as to make the resulting frequencies exceedingly difficult to detect by an unauthorized person as shown in a second picture 210. A first picture 212 in FIG. 9 shows the readings of carrier signal 20 in Broughton are synchronized to the horizontal synch and result in a corresponding frequency of approximately 8 kHz as shown in a second picture 214.

Figure 10:
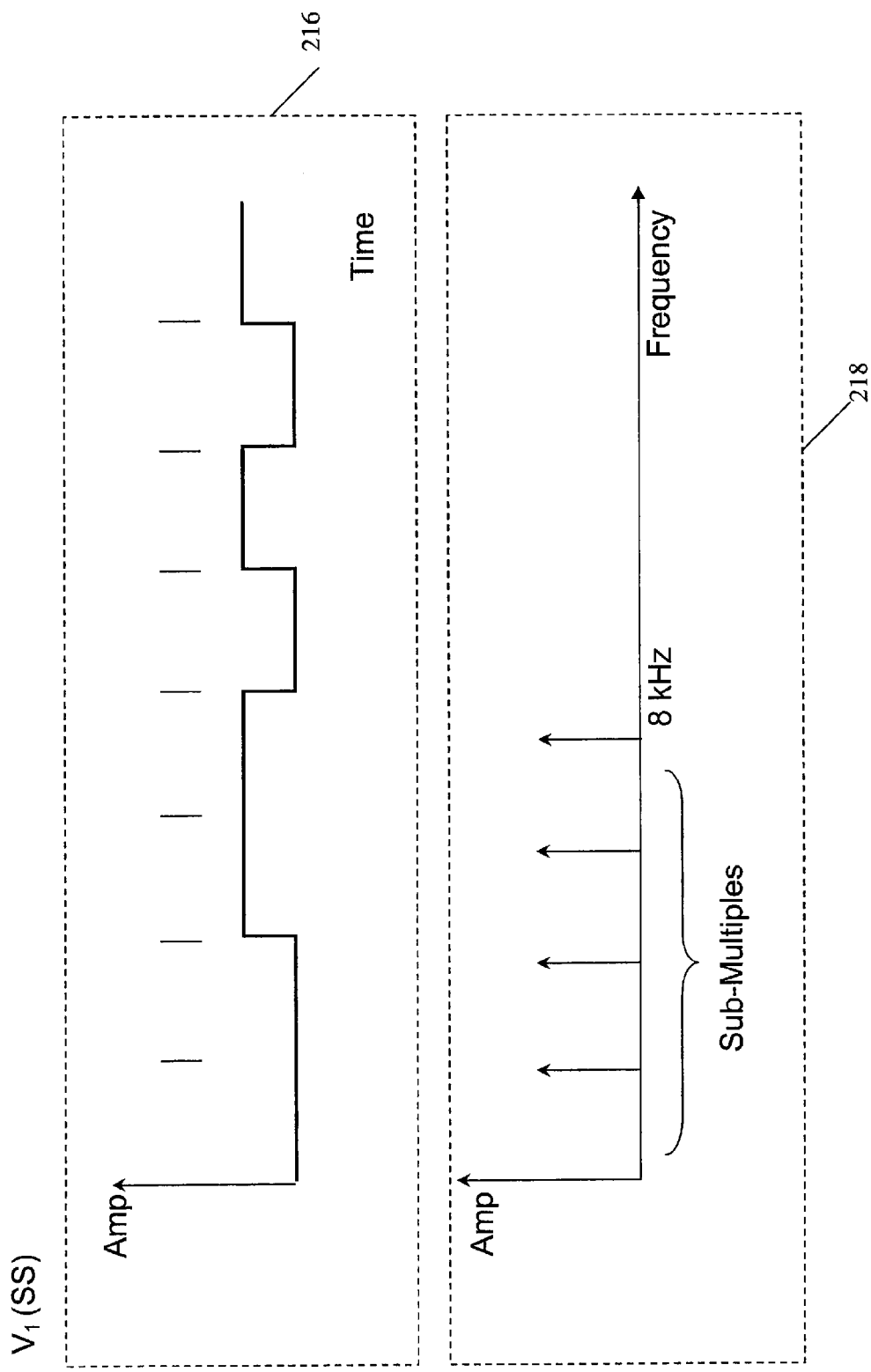
FIG. 10 is a timing diagram.

Referring to FIG. 10, the varied change in intensities of the preferred embodiment of the present invention as shown in a first picture 216 results in a number of frequencies, thereby spreading the spectrum such that a single frequency is not present as shown in a second picture 218. Because the patterns at which carrier signal 20 can be modulated in the present invention are varied, the resulting frequencies will vary depending on what scan lines encoder 12 increases or decreases intensity of the pixels and by the voltage added to or subtracted from these pixels.

Figure 11:
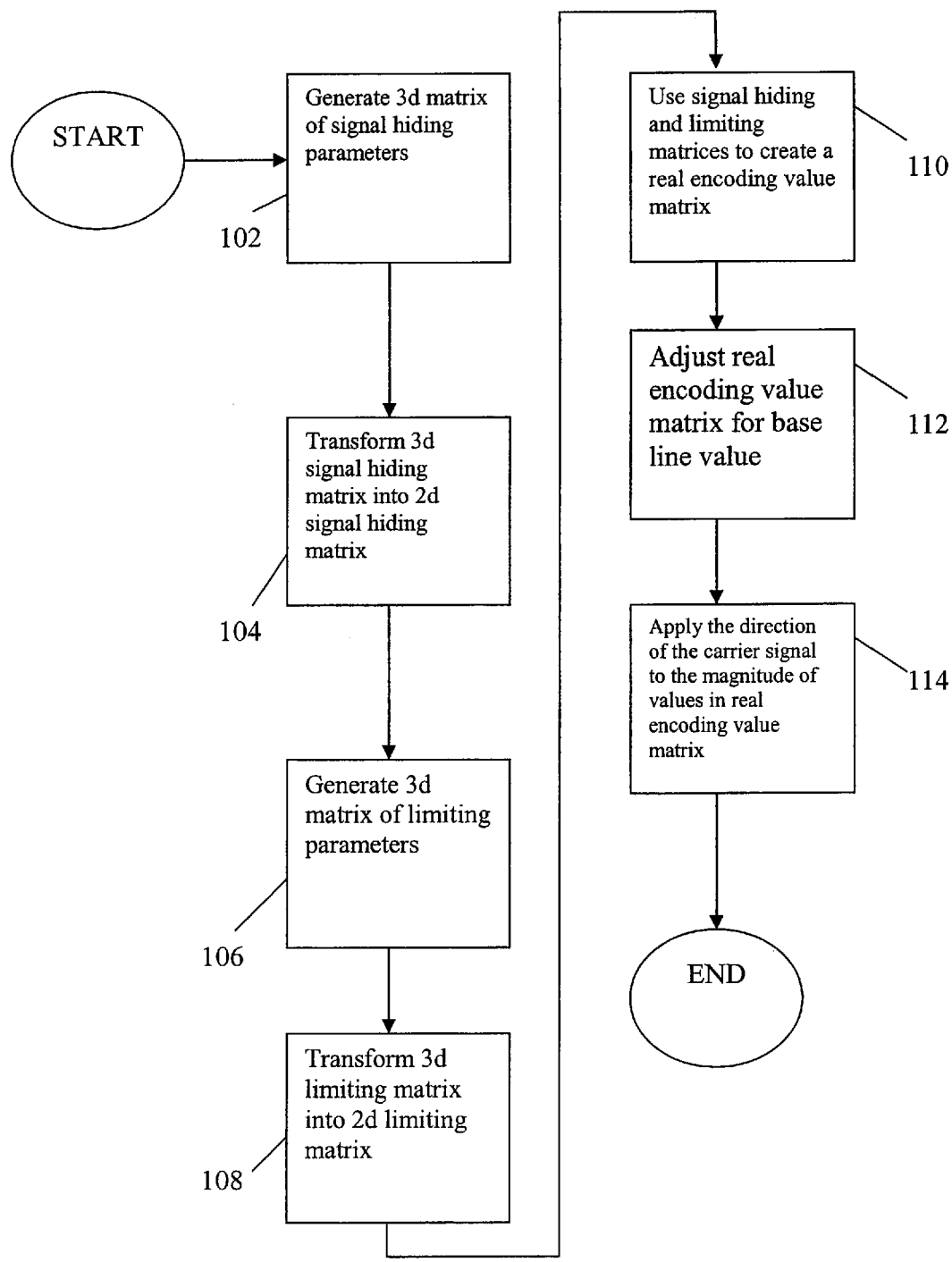
FIG. 11 is a second flowchart of an example encoding method.

Referring to FIG. 11, the preferred method of determining the optimum level of carrier signal 20 for the pixels on the scan lines of video signal 18 is shown to first comprise a step 102 where a device (e.g., encoder 12 or detector 13) generates a three dimensional matrix consisting of signal hiding values as described in greater detail below. The three dimensional matrix consists of a plurality of two dimensional sub-matrices each of which corresponds to a particular hiding technique used with the present invention. Each of the sub-matrices of the three dimensional signal hiding matrix consists of a sub-matrix (i.e., table) of positions that directly correspond with similarly positioned pixels of a frame of video signal 18. The values recorded in the positions of the sub-matrices indicate the maximum amount of intensity that may be added to (or subtracted from if the scan line is a down line) the corresponding pixel based on a particular hiding technique, where each hiding technique may indicate a different value based upon an obtained measurement.

Once the three dimensional signal hiding matrix is generated, the three dimensional signal hiding matrix at step 104 is transformed into a two dimensional signal hiding matrix as described in greater detail below. By transforming the three dimensional signal hiding matrix, the device has a two dimensional signal hiding matrix which has a plurality of values that correspond to the maximum signal hiding capability of corresponding pixels of the frame of video signal 18 according to all utilized signal hiding techniques.

The device at step 106 generates a three dimensional matrix consisting of limiting parameters as described in greater detail below. The three dimensional limiting matrix consists of one or more two dimensional limiting sub-matrices, with each sub-matrix comprising a table of values that correlate with the pixels of a frame of video signal 18 and indicate the maximum amount (i.e., ceiling) of intensity that may be added to or subtracted from the corresponding pixel based on a particular limiting technique as discussed in greater detail below.

The device thereafter at step 108 transforms the three dimensional limiting matrix into a two dimensional limiting matrix as described in greater detail below. By transforming the three dimensional limiting matrix, the device has a two dimensional limiting matrix with a table of values that correspond to a ceiling on the amount of intensity that can be added to corresponding pixels of the frame of video signal 18 before the change may become visible to the viewer of video signal 18.

Once the generation and transformation of the signal hiding matrix and limiting matrix is complete, the device at step 110 compares the signal hiding matrix with the limiting matrix to create a real encoding value matrix as described in greater detail below. The real encoding value matrix contains the maximum values of the two dimensional signal hiding matrix subject to the ceiling of the two dimensional limiting matrix. At step 112, the device adjusts the real encoding value matrix by comparing its values against a plurality of base line values to ensure that a minimal level of signal is added to portions of video signal 18 where needed, despite that the device previously determined that the inclusion of the additional intensity would potentially make a slight visual disturbance in the picture of video signal 18.

Once the magnitude of the values of real encoding value matrix are set, the device at step 114 applies the direction of carrier signal 20 to the magnitude of the values in the real encoding value matrix as described in greater detail below. Therefore, the positions of the real encoding value matrix indicate the amount of intensity that a pixel is to be increased or decreased for a particular frame of video signal 18.

Upon completion, the signal hiding optimization method is complete and the device thereafter applies the values of the real encoding value matrix to video signal 18 according to a video encoding technique as described in greater detail above. Alternatively, the device may instead of using the full values of the positions of the real encoding value matrix may in a preferred embodiment optionally use a random or pseudo-random portion of the full values of the positions so as to further reduce the possibility of a viewer perceiving carrier signal 20 in video signal 18.

Figure 12:
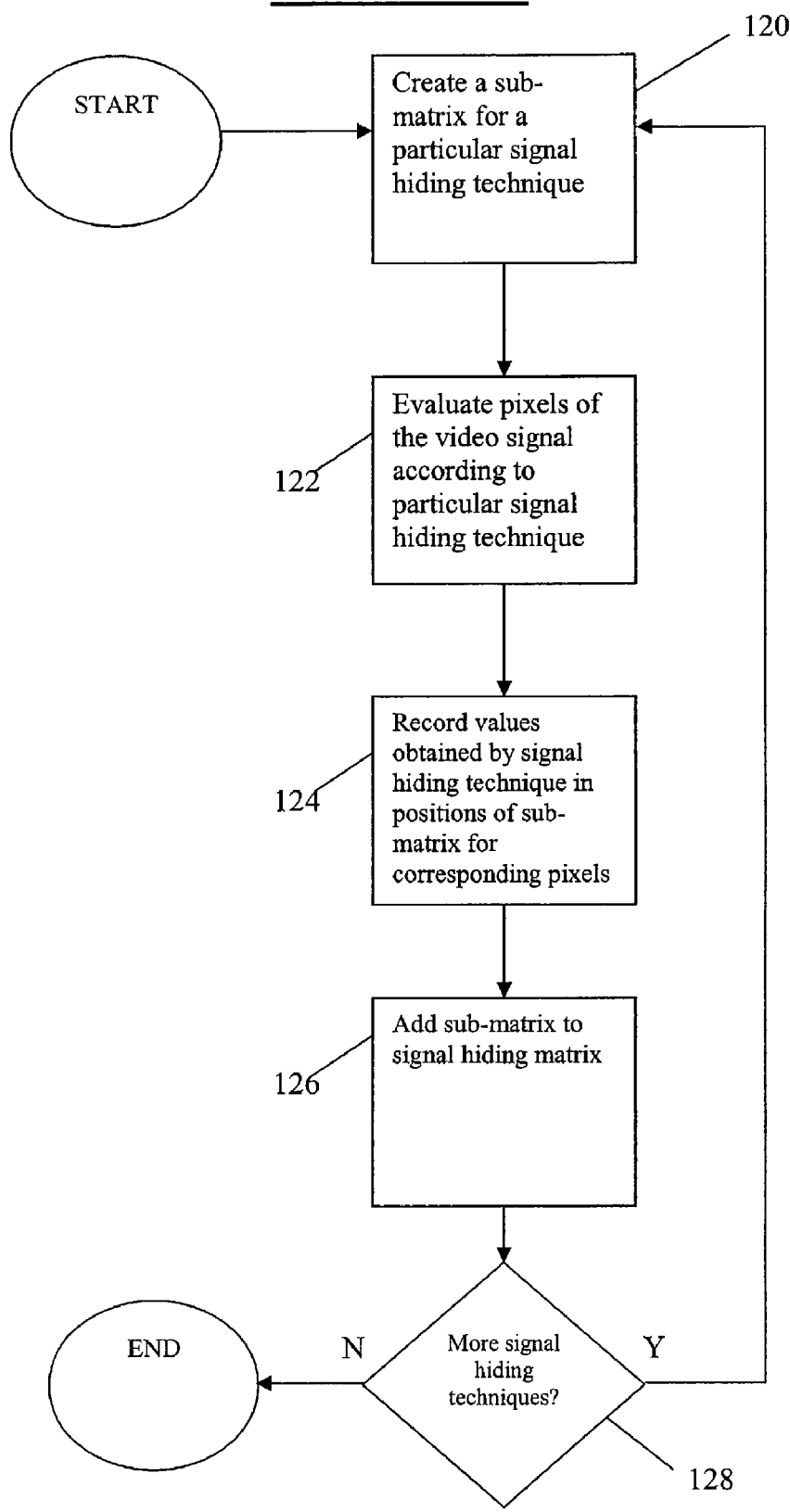
FIG. 12 is a flowchart of a method of creating a signal hiding matrix according to an example embodiment.

Referring to FIG. 12, the process of generating a signal hiding matrix is shown to comprise a first step 120 where the device creates a sub-matrix for a particular hiding technique. The sub-matrix has signal hiding positions corresponding to each of the pixels of the frame of video signal 18 or a predetermined portion thereof. Thereafter, the device at step 122 evaluates the pixels of video signal 18 according to a particular hiding technique, such as the edge encoding technique described in greater detail below. At step 124, the device records the values obtained by the signal hiding technique in positions of the sub-matrix that correspond to the pixels of the frame of video signal 18. Once the values are recorded, at step 126 the sub-matrix of the signal hiding technique is added to the signal hiding matrix.

The device thereafter at decision point 128 determines whether there are additional signal hiding techniques for the particular frame of video signal 18. If yes, then the device returns to step 120 to create a new sub-matrix for inclusion in the signal hiding matrix for the additional signal hiding technique. If no, the device completes the process for creating a signal hiding matrix.

Figure 13:
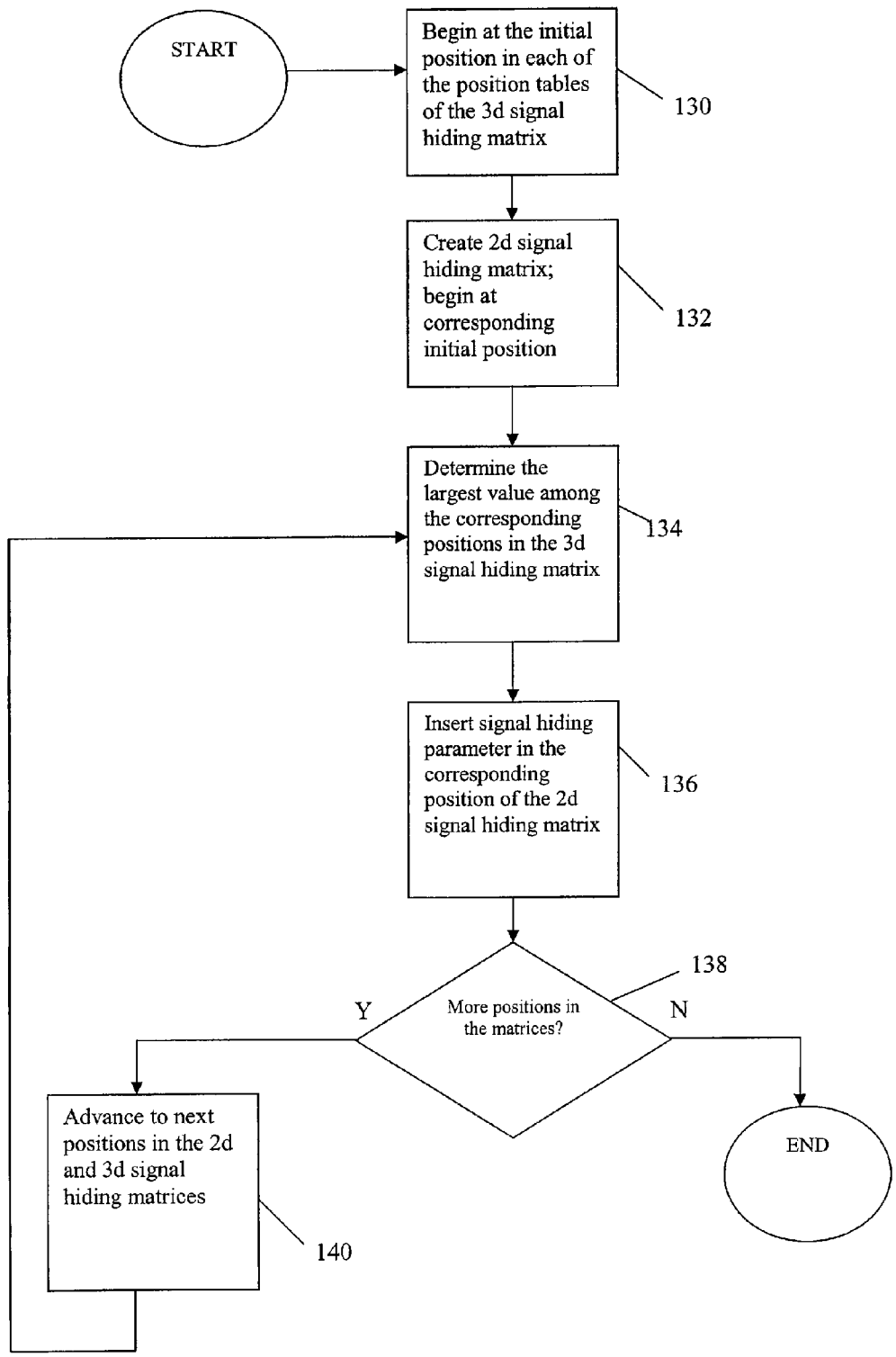
FIG. 13 is a flowchart of a method of transforming a signal hiding matrix according to an example embodiment.

Referring to FIG. 13, the process of transforming the signal hiding matrix is shown to first comprise a first step 130 at which the device initializes a series of pointers to the initial positions in each of the sub-matrices of the signal hiding matrix. Thereafter, the device at step 132 creates a two dimensional signal hiding matrix and initializes a pointer to its initial position. Thus, the position that is being pointed in the two dimensional matrix corresponds to the same position in each of the sub-matrices of the three dimensional signal hiding matrix.

The device at step 134 determines the largest value among the corresponding positions in the sub-matrices of the three dimensional signal hiding matrix, thus determining according to the various hiding techniques the maximum possible alteration (i.e., increase or decrease) in intensity for a particular pixel. The value for the maximum alteration in step 136 is stored in a corresponding position in the two dimensional signal hiding matrix.

The device at decision point 138 then determines whether there are additional corresponding positions in the two and three dimensional signal hiding matrices. If yes, then the pointers associated with the sub-matrices of the three dimensional signal hiding matrix and two dimensional signal hiding matrix advance to the next position at step 140 and return to step 134. If no, then the device completes the process of transforming the signal hiding matrix.

Figure 14:
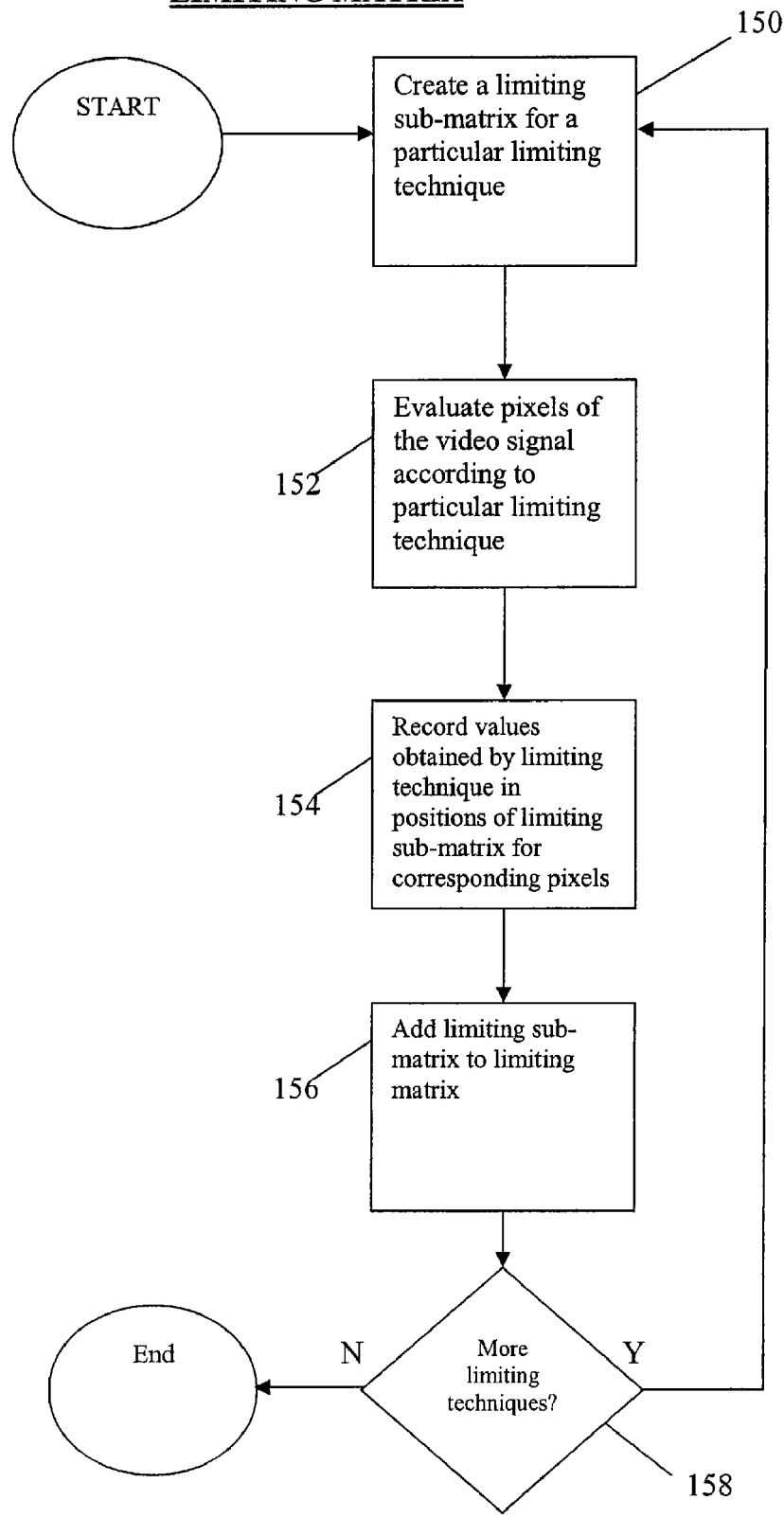
FIG. 14 is a flowchart of a method of creating a limiting matrix according to an example embodiment.

Referring to FIG. 14, the process for generating a limiting matrix is shown to first comprise a step 150 at which the device creates a limiting sub-matrix for a particular limiting technique. Thereafter, the device at step 152 evaluates the frame of video signal 18 according to a particular limiting technique. The device at step 154 records values obtained by the limiting technique in the limiting positions of the limiting sub-matrix for corresponding pixels. Upon completion, the device at step 156 adds the limiting sub-matrix to the three dimensional limiting matrix.

At decision point 158, the device determines whether there are more limiting techniques for the frame of video signal 18. If yes, then the device returns to step 150 for the creation of an additional limiting sub-matrix. If no, the device completes the process of creating the limiting matrix.

Figure 15:
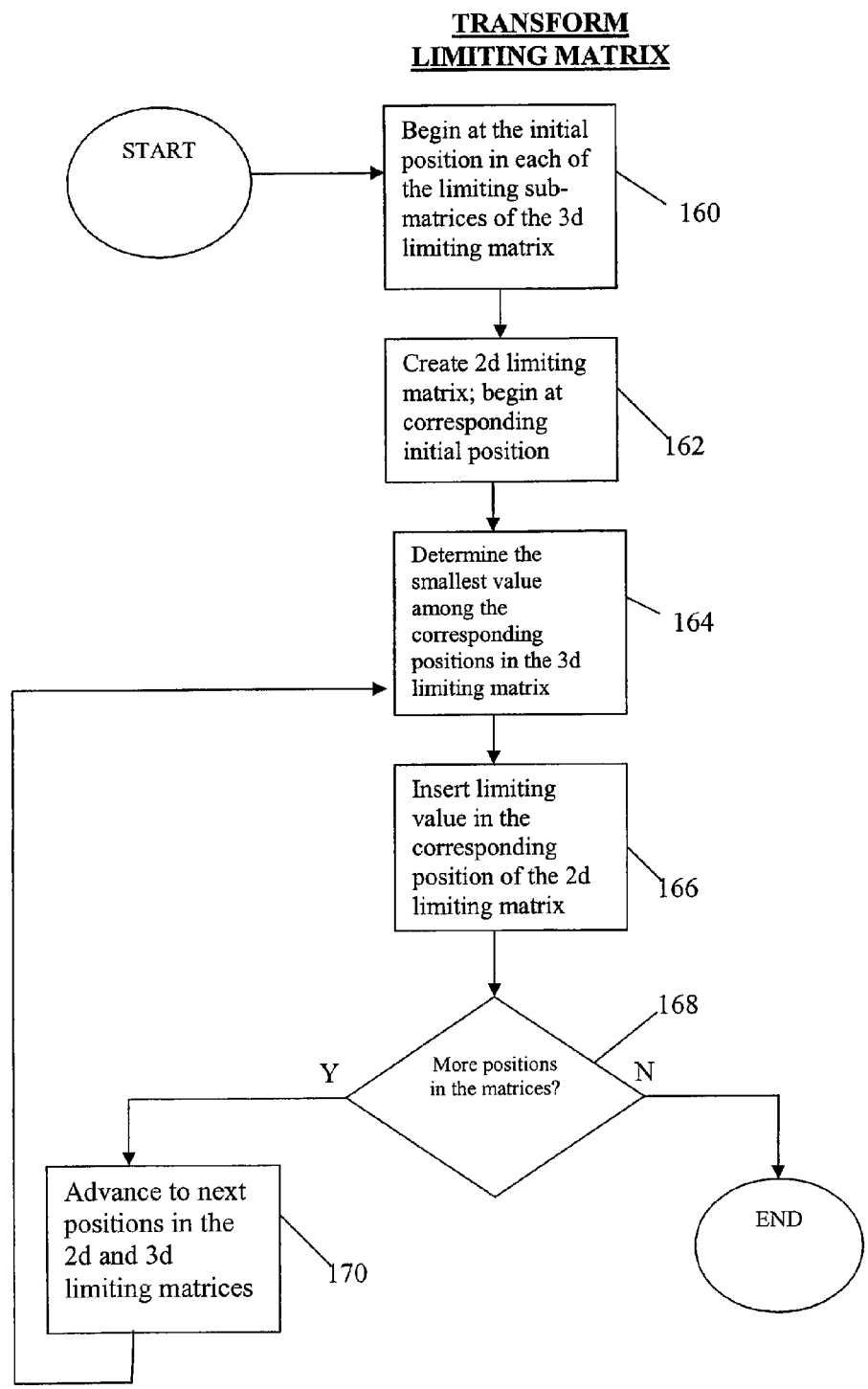
FIG. 15 is a flowchart of a method of transforming a limiting matrix according to an example embodiment.

Referring to FIG. 15, the process for transforming the limiting matrix is shown to first comprise a step 160 at which the device initializes a series of pointers to the initial positions in each of the sub-matrices of the limiting hiding matrix. Thereafter, the device at step 162 creates a two dimensional limiting matrix and initializes a pointer to the corresponding initial positions. Thus, the position that is being pointed to in the two dimensional matrix corresponds to the same positions in each of the sub-matrices of the three dimensional limiting matrix.

The device at step 164 determines the smallest value among the corresponding positions in the sub-matrices of the three dimensional limiting matrix, thus determining according to the limiting techniques the ceiling of the intensity that can be added to a particular pixel. The ceiling value in step 166 is stored in a corresponding position in the two dimensional limiting matrix.

The device at decision point 168 determines whether there are additional corresponding positions in the two and three dimensional limiting matrices. If yes, then the pointers associated with the sub-matrices of the three dimensional limiting matrix and two dimensional limiting matrix advance to the next positions at step 170 and return to step 164. If no, then the device completes the process of transforming the limiting matrix.

Figure 16:
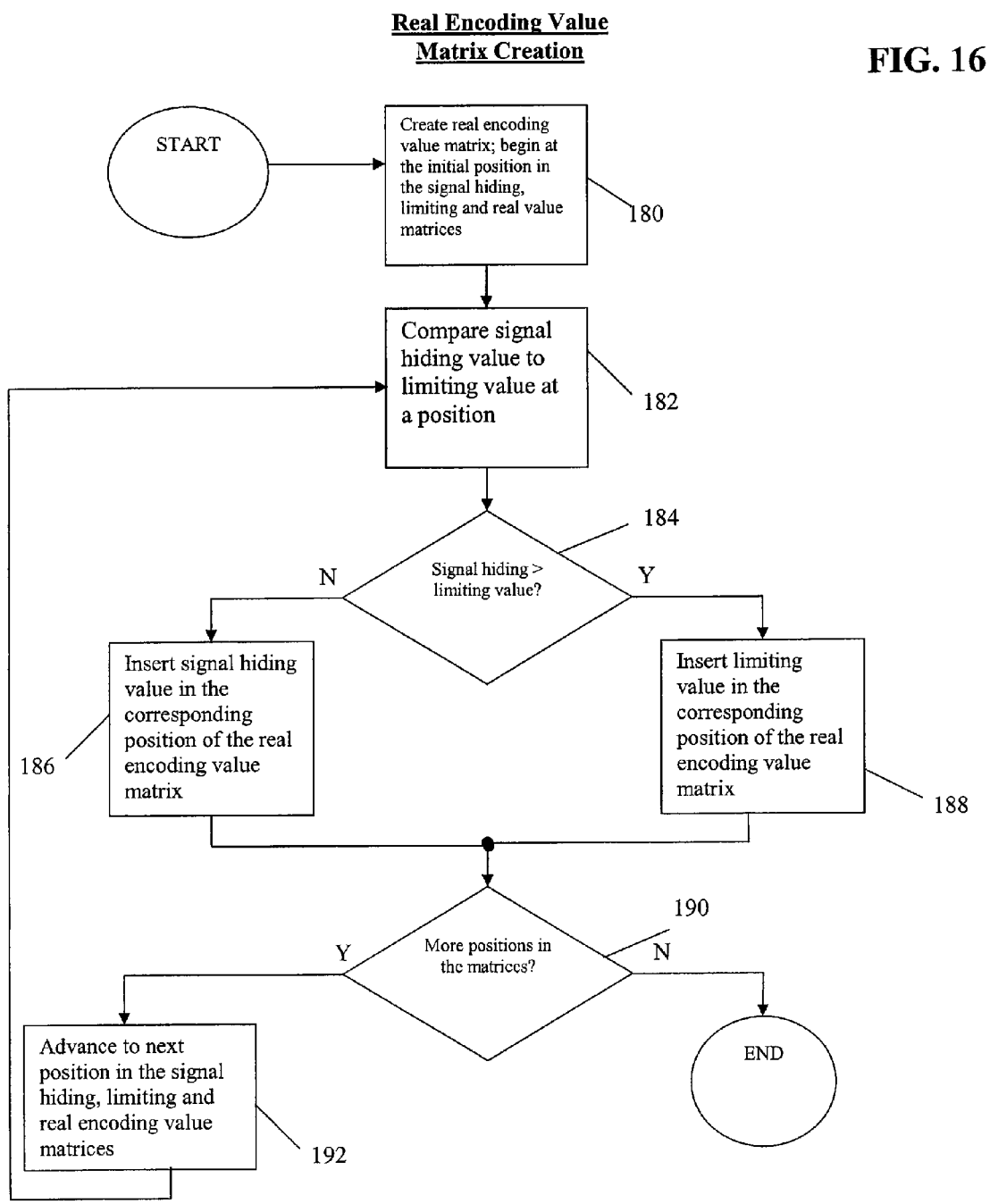
FIG. 16 is a flowchart of a method of creating a real encoding value matrix according to an example embodiment.

Referring to FIG. 16, the process for creating the real encoding value matrix is shown to first comprise a step 180 at which the device creates the real encoding value matrix and initializes pointers to the initial positions in the two dimensional signal hiding matrix, two dimensional limiting matrix and real encoding value matrix. Thereafter, the device at step 182 compares the signal hiding value with the limiting value in corresponding positions of the signal hiding matrix and limiting matrix to determine whether the value of the signal hiding matrix exceeds the ceiling as indicated by the value in the limiting matrix.

If the device at decision point 184 determines that the signal hiding value is not greater than the limiting value, then the device at step 186 copies the signal hiding value into the corresponding position of the real encoding value matrix. Thus, the device determined that the signal hiding value does not exceed the limiting value.

If the device at decision point 184 determines that the signal hiding value is greater than or equal to the limiting value, then the device at step 188 copies the limiting value into the corresponding position of the real encoding value matrix. Thus, the device determined that the signal hiding value exceeded the ceiling, and accordingly must be reduced to the ceiling value.

After the insertion into the real encoding value matrix at step 186 or step 188, the device at decision point 190 determines whether there are more positions left in the signal hiding matrix, limiting matrix and real encoding value matrix. If yes, then the device proceeds to step 192 at which it advances the pointers in the signal hiding matrix, limiting matrix and real encoding value matrix to the next positions. Thereafter, the device returns to step 182 to compare the values. If no, then the device completes the process of creating the real encoding matrix.

Figure 17:
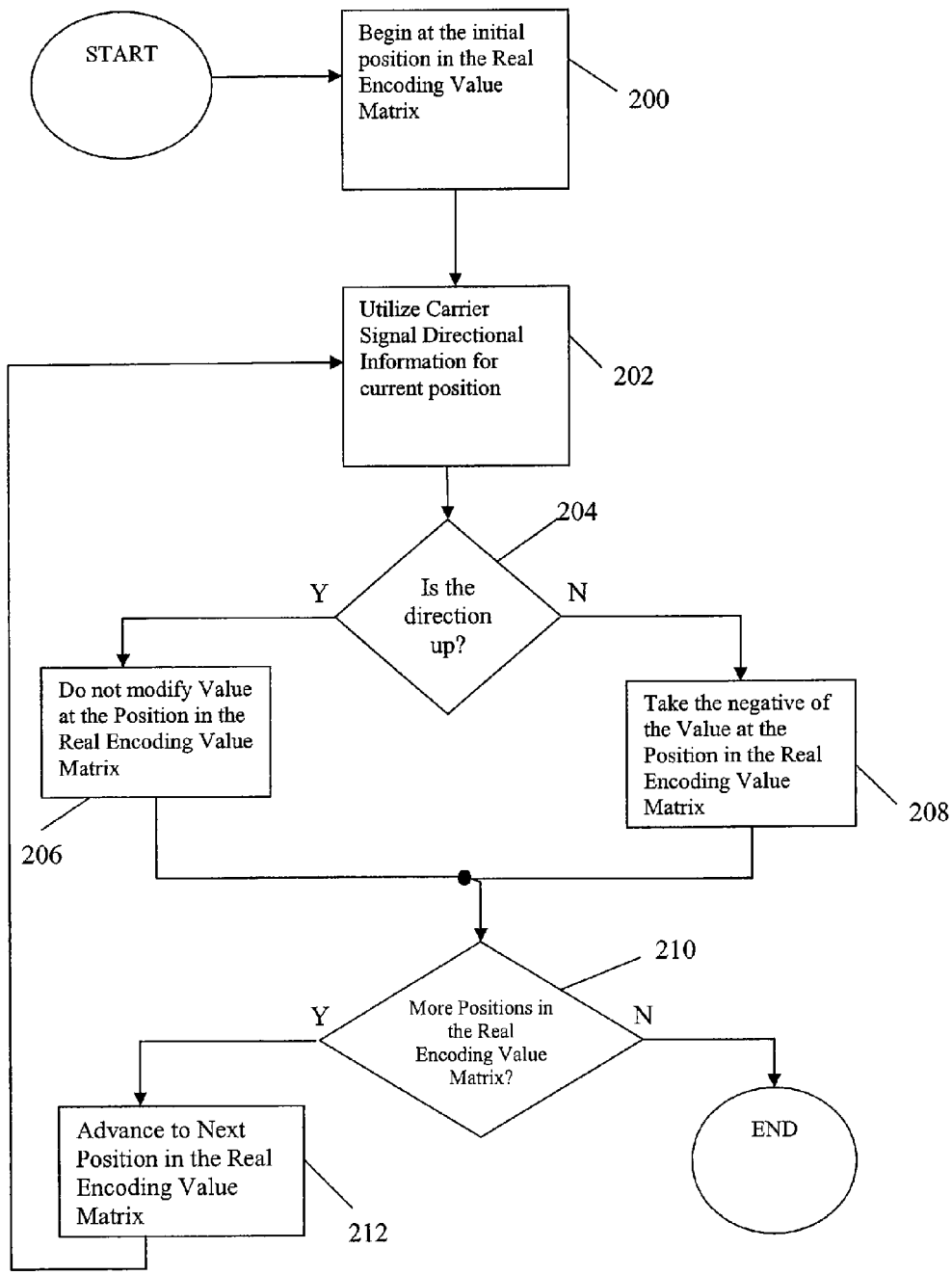
FIG. 17 is a flowchart of a method of applying the carrier signal according to an example embodiment.

Referring to FIG. 17, the process for applying the direction of the carrier signal to the magnitude of the values in the real encoding value matrix is shown to first comprise a step 200 at which encoder 12 points to the initial position of the real encoding value matrix. Thereafter, encoder 12 at step 202 obtains carrier signal 20 and the associated directional information for the value of carrier signal 20 at the current position in the real encoding value matrix. It should be appreciated that the direction information for the scan lines and the pixels associated therewith were designated by encoder 12 at step 82 as described above.

Encoder 12 at decision point 204 determines whether the direction of carrier signal 20 is up or down, such that encoder 12 will add to the intensity (i.e., "up") or subtract from the intensity (i.e., "down") of the pixels of the associated video scan line. If the direction is up, encoder 12 at step 206 does not alter the current value in the real encoding value matrix. If the direction is down, then encoder 12 at step 208 replaces the value at the position in the real encoding value matrix with the negative of the value.

After encoder 12 processes the selected value at steps 206 or 208, encoder 12 proceeds to decision point 210 to determine if there are more positions in the real encoding value matrix which it must analyze in view of the direction of carrier signal 20. If yes, encoder 12 at step 212 advances the pointer in the real encoding value matrix to the next position and returns to step 202. If no, encoder 12 completes the process of carrier signal application.

Referring back to FIG. 5, when the real encoding value matrix is finally complete after step 114, encoder 12 at step 86 applies the combination of the real encoding value matrix and carrier signal 20 to a frame of video signal 18. Thereupon, encoder 12 at step 89 produces from video signal 18 modulated video signal 22 that is optimally modulated with carrier signal 20 and ready for transmission or distribution.

The present invention contemplates various and multiple techniques for hiding signals with the present invention. Each of these techniques generates a respective sub-matrix which is added to the three dimensional signal hiding matrix.

Figure 18:
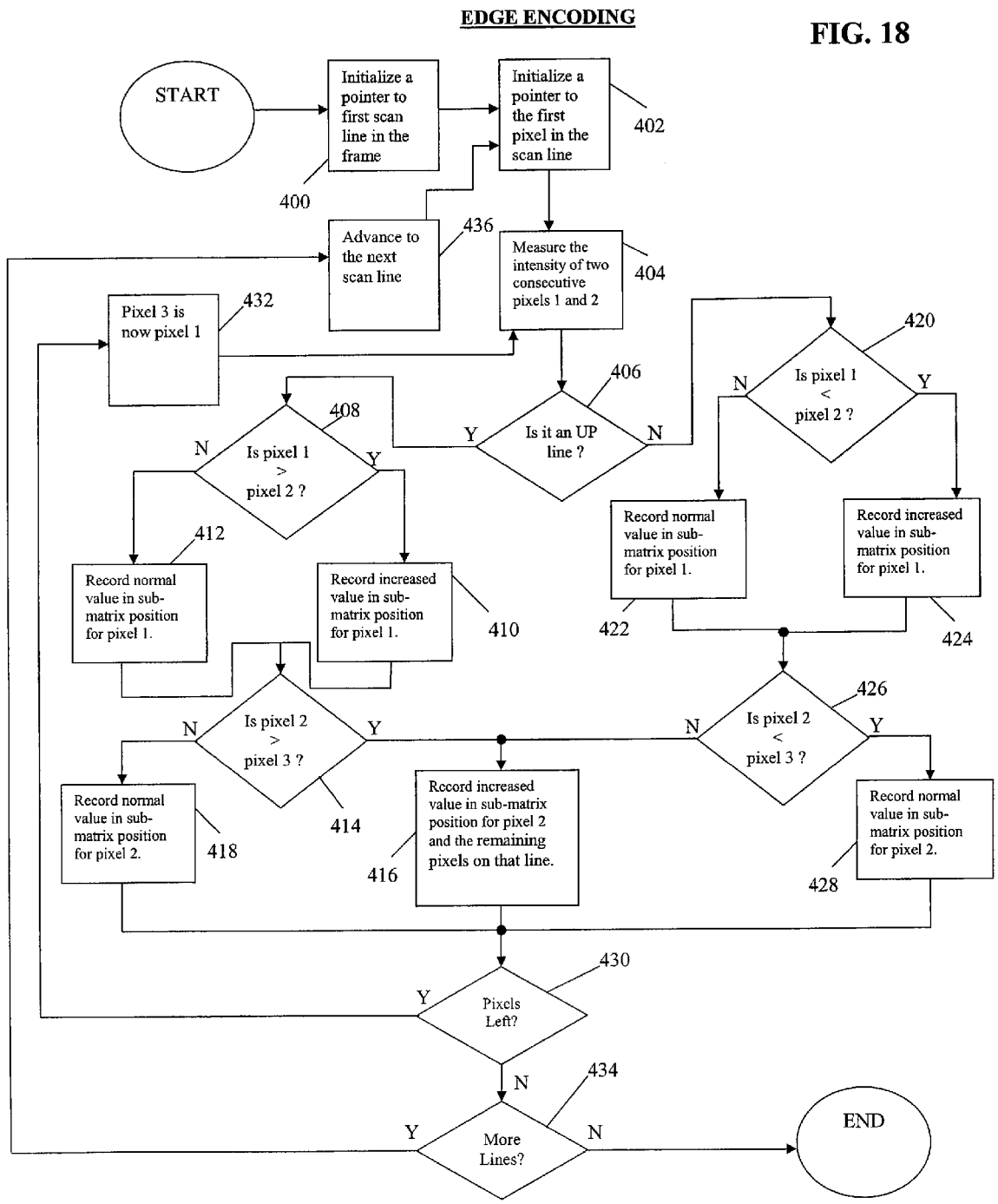
FIG. 18 is a flowchart of a method of signal hiding according to an example embodiment.

Referring to FIG. 18, a first example of such a signal hiding technique, hereinafter termed "edge enhancements", is shown. The device at step 400 first initializes a pointer to the first scan line in the frame of video signal 18. Thereafter, the device at step 402 initializes a pointer to the first pixel in the current scan line. After setting the appropriate pointers, the device at step 404 measures as per the video scan on each scan line in the frame from left to right the intensity of two consecutive pixels starting from the current pixel, which are hereinafter referred to as pixels 1 and 2 regardless of their position on the scan line.

The device at decision point 406 determines whether the current scan line is an up line as described above. If the current scan line is an up line, then the device proceeds at decision point 408 to determine whether the intensity of pixel 1 is greater than the intensity of pixel 2. If yes, the device has determined that a sharp edge (i.e., contrast in an adjacent pixel in the same frame of video signal 18) is present in video signal 18 and at step 410 the device records the ability to modulate a greater amount of intensity by storing a higher value with respect to pixel 1 in the signal hiding sub-matrix. If no, the device at step 412 stores a normal hiding value with respect to pixel 1 in the signal hiding sub-matrix.

After recording the signal hiding value for pixel 1, the device at step 414 determines whether the intensity of pixel 2 is greater than the next pixel (i.e., pixel 3). If yes, the device at step 416 records the increased value of intensity to pixel 2 in the signal hiding sub-matrix and records the same value for all other pixels on the current scan line. Otherwise, if pixel 2 is not greater than pixel 3, then the device at step 418 records a normal value in the sub-matrix position for pixel 2.

If the device at step 410 determines that the current scan line is not an up line (i.e., a down line), then the device proceeds at decision point 420 to determine whether the intensity of pixel 1 is less than the intensity of pixel 2. If the intensity is less, the device has determined that a sharp edge is present in video signal 18 and at step 442 the device records the ability to modulate a larger amount of intensity by storing a higher value with respect to pixel 1 in the signal hiding sub-matrix. If no, the device at step 424 stores a normal hiding value with respect to pixel 1 in the signal hiding sub-matrix.

Upon completion of either step 422 or step 424, the device proceeds to decision point 426 to determine whether the intensity of pixel 2 is less than the intensity of pixel 3. If the intensity is less, then at step 416 the device records the increased value of intensity to pixel 2 in the signal hiding sub-matrix and records the same value for all other pixels on the current scan line. Otherwise, the device at step 428 records a normal value in the sub-matrix position for pixel 2.

The device then determines at decision point 430 whether there are more pixels left on the current scan line. If yes, the device proceeds to step 432 where it sets the current pixel 3 to pixel 1. Thereafter, the device returns to step 404 to further process the pixels of the scan line of video signal 18.

If at decision point 430 there are no pixels left on the current scan line of video signal 18, then the device proceeds to decision point 434 to determine if there are addition scan lines to process in the frame of video signal 18. If yes, then the device proceeds to step 436 where the pointer advances to the next row in the signal hiding sub-matrix representing the next scan line in the frame. If no, then the process of edge encoding is complete.

Another signal hiding technique of the present invention utilizes motion, or spatial changes in luminance over time (hereinafter termed "spatial changes"), as a factor in determining how much intensity may be added to or removed from various pixels on the scan lines of video signal 18. The device looks at the same pixel over multiple frames of video signal 18 to determine if there is a large spatial change, and thus an edge in the temporal direction. If there is such a change, during the motion hiding technique the device records appropriate values in the signal hiding sub-matrix to reflect the amount of intensity that may be added or removed from the pixel for each frame of video signal 18 for all of the pixels in the frame.

Yet another hiding technique of the present invention is the luminance hiding technique (hereinafter termed "luminance levels"). With this technique, the device generates hiding values for a signal hiding sub-matrix based on the determination that the lighter the luminance of a pixel the more the intensity may be altered by the device, while the darker the luminance the less the pixel intensity may be altered. For example, at lower levels of luminosity the value recorded in the signal hiding sub-matrix by the device may be three, while with higher levels of luminosity the value recorded may be one. The relationship between luminosity and intensity and the value recorded in the signal hiding sub-matrix is preferably linear, but may also be gamma corrected as desired.

The present invention preferably uses edge encoding, spatial changes and luminance levels as hiding techniques with the present invention. However, it should be understood that other techniques including chrominance may be used as hiding techniques and are felt to fall within the present invention. The present invention also contemplates the use of one or more limiting techniques. In the preferred embodiment, encoder 12 utilizes a luminance limiting technique.

Figure 19:
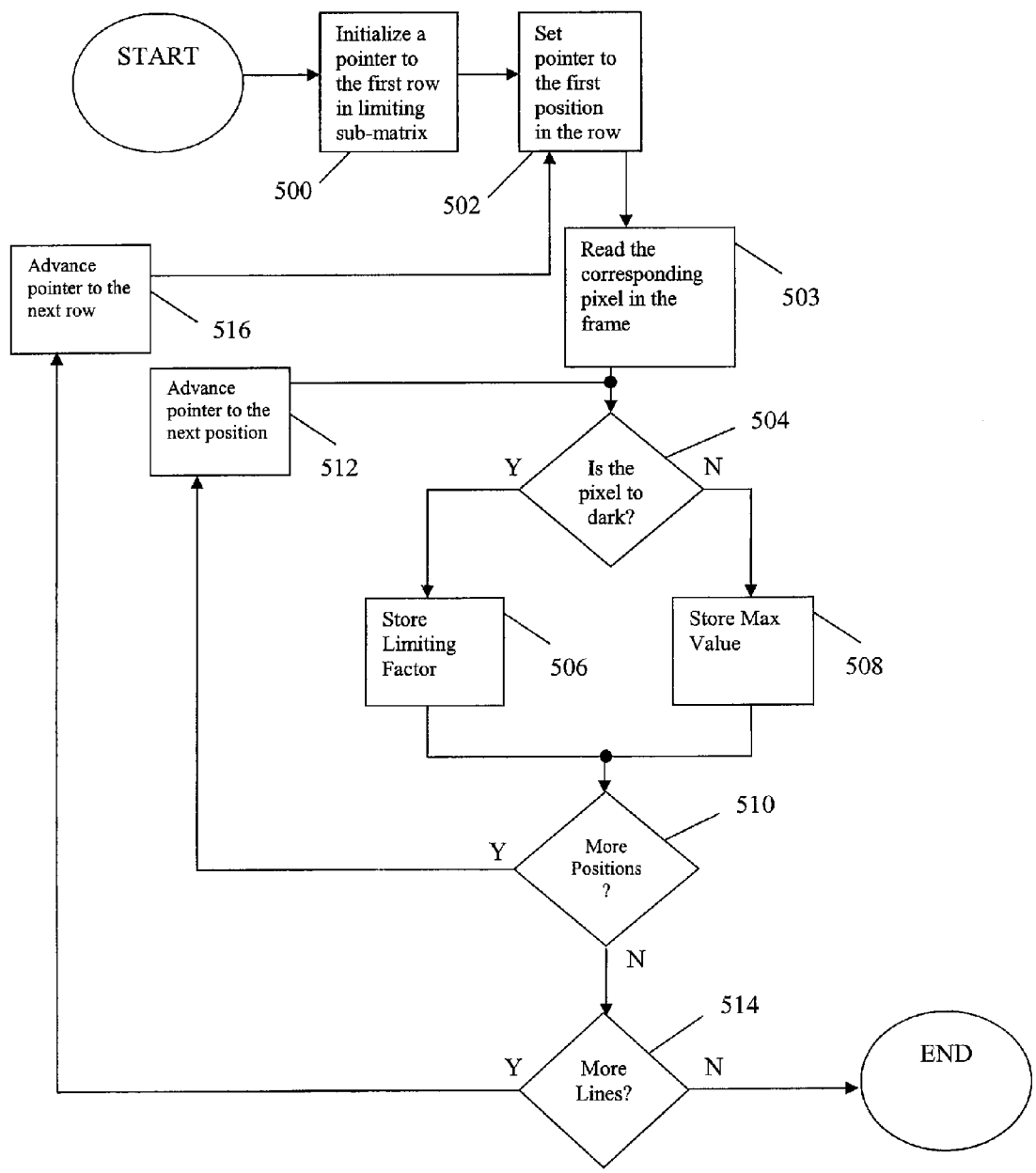
FIG. 19 is a flowchart of a method of signal limiting according to an example embodiment.

Referring to FIG. 19, the luminance limiting technique is shown to first comprise a step 500 where the device implements the luminance limiting technique by initializing a pointer to the first row in the limiting sub-matrix. Thereafter, the device at step 502 directs the pointer to the first position in the current row of the limiting sub-matrix.

The device at step 503 measures the luminance of the pixel from video signal 18 that corresponds to the current position in the limiting sub-matrix. Thereafter, the device at decision point 504 determines if the pixel is too dark to increase the intensity. If yes, the device proceeds to step 506 and records a value in the limiting sub-matrix to indicate the ceiling by which the device 12 can alter the intensity of the current pixel in video signal 18. If no, the device proceeds to step 508 to record a maximum value in the limiting sub-matrix to indicate that the corresponding pixel does not have a ceiling.

The device at step 510 determines if there is another position on the current row of limiting sub-matrix. If yes, the device proceeds to step 512 where it advances the pointer to the next position in the row and returns to decision point 504 thereafter. If no, the device proceeds to decision point 514 to determine whether there are more lines in limiting sub-matrix. If yes, the device proceeds to step 516 to advance the pointer to the next row and thereafter proceeds to step 502. If no, the device terminates the luminance limiting technique.

In addition to the foregoing luminance limiting technique, further limiting techniques are felt to fall within the present invention and may be developed based on observation of the effects of modulation on video signal 18.

Figure 20:
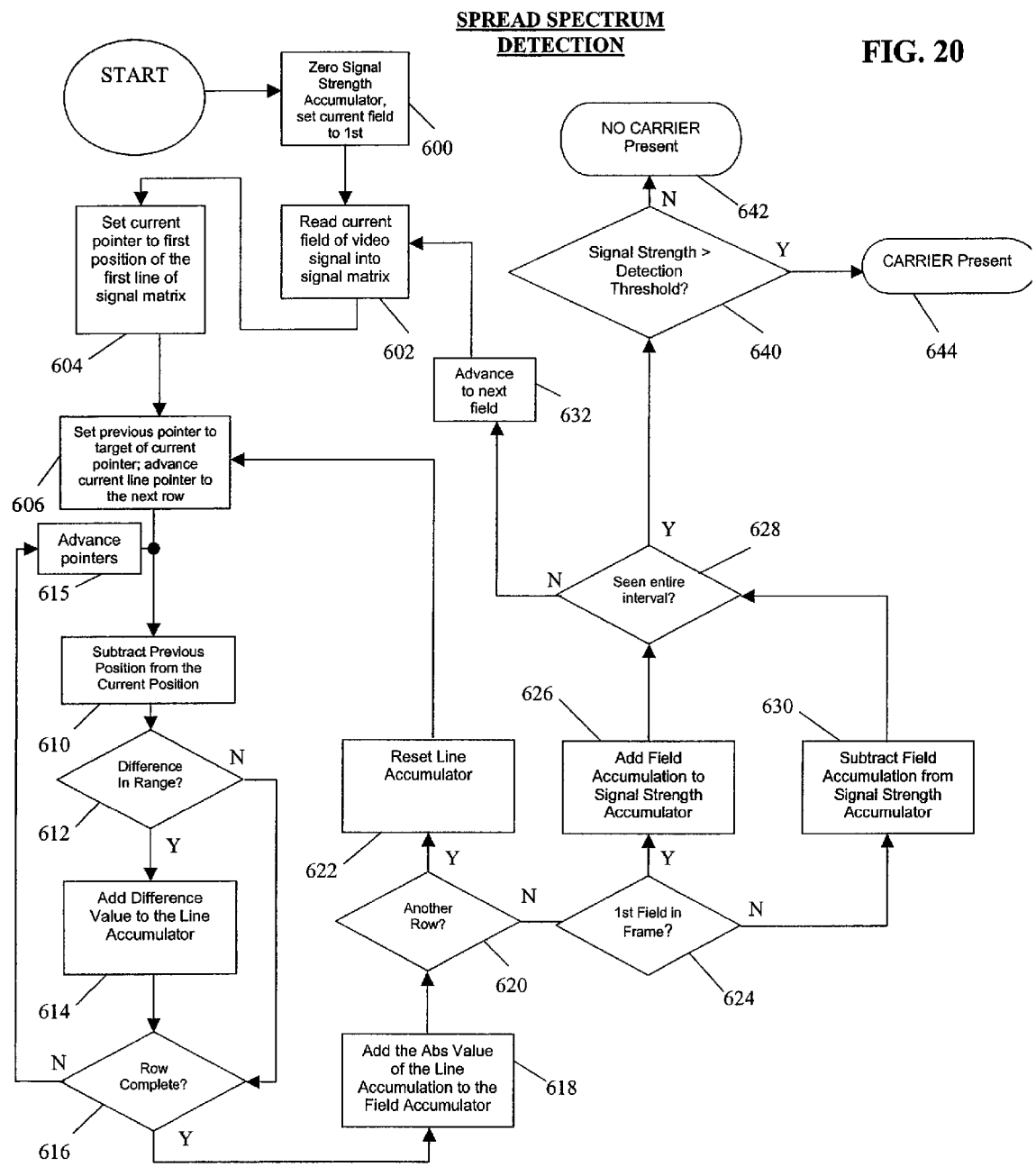
FIG. 20 is a flowchart of a first decoding method according to an example embodiment.

Referring to FIG. 20, the preferred detecting method is shown at step 600 to first comprise detector 13 zeroing out a signal strength indicator, which accumulates the net result of line to line differences over a series of fields during a time interval and is preferably accessible in an area of storage 40. In addition, the current field of video signal 18 at step 600 is the first field.

Detector 13 at step 602 reads the current field of video signal 18 into a signal matrix in storage 40, wherein the signal matrix has positions that correspond to the pixels of a field of video signal 18 and are preferably ordered in pixel order from left to right and from top to bottom.

Upon completion of step 602, detector 13 sets the current pointer to the first line of the signal matrix at step 604. Thereafter, detector 13 at step 606 configures previous pointer to the position of current pointer and then sets current pointer to the same position on the next row in the signal matrix.

Detector 13 at step 610 obtains a difference value by subtracting the value at the position pointed to by the previous pointer from the value at the position pointed to by the current pointer. The difference value is verified to be a proper value at step 612, such that if the difference value is out of range then it is discarded and detector 13 advances to step 616. The difference value may be out of range if there is a stark contrast in intensity of adjacent pixels, such as a black pixel next to a white pixel. If the difference value is within the range, then detector 13 at step 614 adds the difference value between the two pixels to the line accumulator.

Detector 13 at decision point 616 determines whether the current row of the signal matrix is complete. If no, then detector 13 proceeds to step 615 to increment current pointer and previous pointer to the next positions on their respective rows and returns to step 610. If yes (i.e., the row is complete), then the absolute value of the line accumulation is added to the field accumulator at step 618.

Detector 13 at decision point 620 determines whether there is another row in the signal matrix. If yes, then detector 13 resets the line accumulator at step 622 and returns to step 606. If no, then detector 13 has determined that all rows in the signal matrix have been read and therefore proceeds to decision point 624.

Detector 13 at decision point 624 determines whether the field that was just analyzed is the first field in the frame of video signal 18. If the field is not the first field (i.e., the second field), detector 13 subtracts the field accumulation from the signal strength accumulation at step 630. If the field is the first field, detector 13 at step 626 adds the field accumulation to the signal strength accumulator. By adding a first modulated field and subtracting a second unmodulated field, the natural frequencies created by the picture of video signal 18 will be removed since the second field is not modified and does not contain carrier signal 22.

Detector 13 at decision point 628 determines whether the interval (e.g., time period) over which it reviews a series of fields has expired. If it has not expired, then detector 13 advances to the next field in video signal 18 at step 632. Thereafter, detector 13 returns to step 602 to analyze the next field of video signal 18.

If the entire interval has been seen at decision point 628 (e.g., the time period has expired), detector 13 at decision point 640 determines whether the signal strength is greater than the detection threshold. If the signal strength is not greater, then carrier signal 22 is not present in video signal 18 and the signaled device 24 at step 642 receives a signal absence. If the signal strength is greater, then signaled device 24 at step 644 receives a signal presence.

Figure 21:
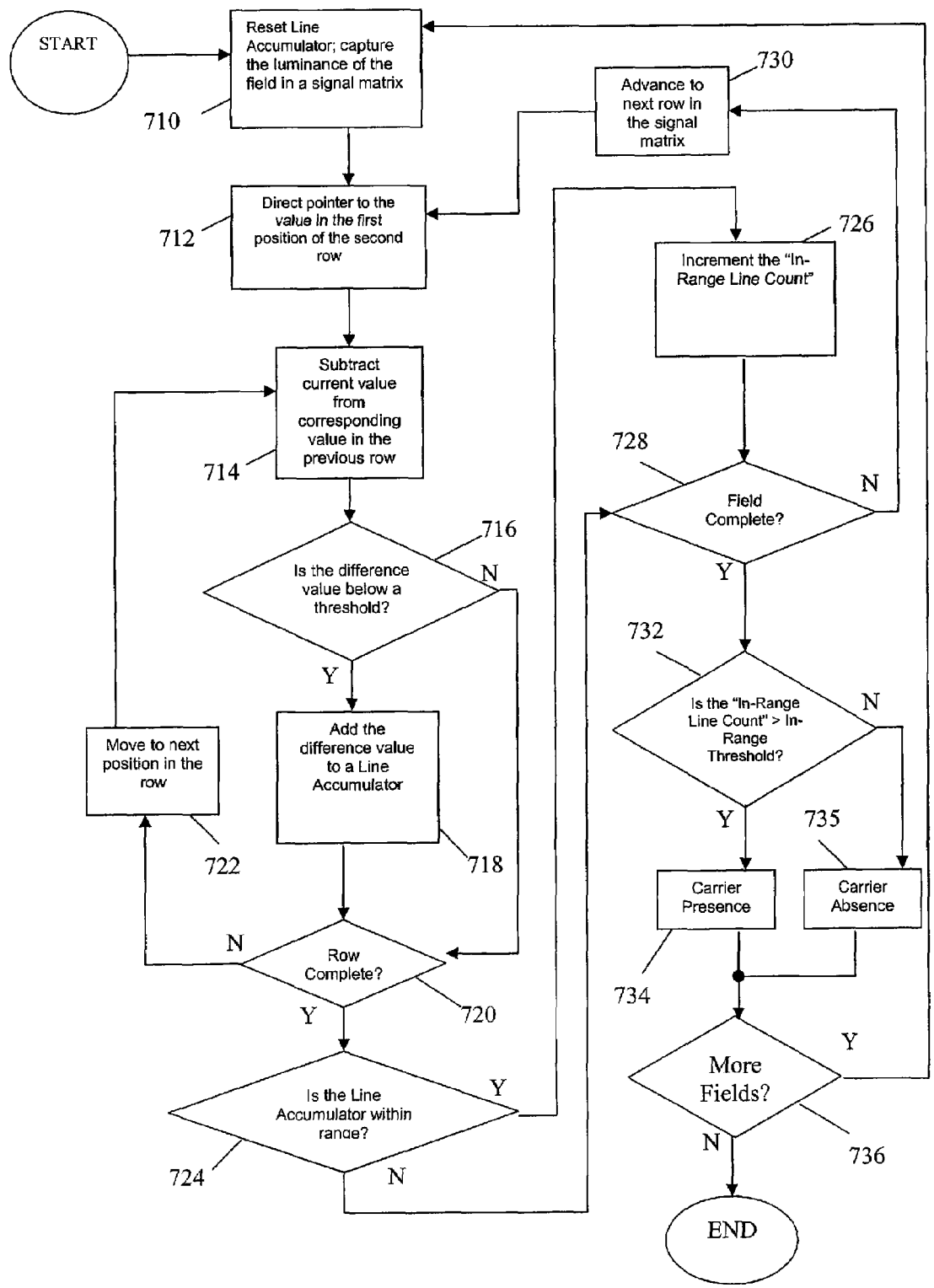
FIG. 21 is a flowchart of a second decoding method according to an example embodiment.

Referring to FIG. 21, a first alternate decoding method of the present invention is shown to first comprise a step 710 where detector 13 captures the luminance of the pixels for a field of video signal 18 and stores the luminance values associated with each pixel in scan line order in a signal matrix on storage 40. In addition, detector 13 at step 710 initializes a line accumulator to accumulate the difference value between corresponding pixels on adjacent scan lines.

Detector 13 at step 712 directs a current position pointer to the first position of the second row in the signal matrix. Detector 13 at step 714 thereafter calculates a difference value by subtracting the value at the current position pointer from the value at the corresponding position that is one row above it in the signal matrix to determine the difference in intensity between the two positions.

Detector 13 at decision point 716 determines whether the previously calculated difference value is below a threshold to verify that the difference value is a proper value. If the difference value is out of range because there is a stark contrast in intensity of adjacent pixels, such as a black pixel next to a white pixel, then the difference value is discarded and detector 13 proceeds to decision point 720. If the difference value is within the range, then at step 718 the difference value is added to the line accumulation.

Detector 13 at decision point 720 determines whether the current position pointer has reached the end of the current row in the signal matrix. If there are values left to be read, then detector 13 advances the current position pointer to the first position on the next row of the signal matrix at step 722 and thereafter returns to step 714.

If at decision point 720 the analysis of the row of the signal matrix is complete, then detector 13 proceeds to decision point 724 to determine whether the line accumulator is within the in-range (as defined below). If the line accumulator is not within the in-range, then detector 13 discards the line accumulator. If the line accumulator is within the in-range, then detector 13 increments the in-range line count at step 726. Thereafter, detector 13 at decision point 728 determines whether the field is complete. If no, detector 13 advances to the next row in the signal matrix at step 730. If yes, detector 13 proceeds to decision point 732.

Detector 13 at step 728 determines whether it has considered all rows in the signal matrix. If no, then detector 13 proceeds to step 730 where it moves the current pointer to the next row in the signal matrix. If the signal matrix representing the field is complete, then detector 13 at decision point 732 determines whether the in-range line count is greater than the in-range threshold. Accordingly, detector 13 attempts to determine at decision point 732 whether the magnitude of line to line differences over the in-range is typical of modulated video signal 22 or video signal 18. If the in-range line count is not greater, then detector 13 directs that signaled device 24 should receive a signal absence at step 735. Thereafter, detector 13 at decision point 736 determines if there are additional fields. If yes, detector 13 returns to step 710. If not, the decoding process is complete.

It should be appreciated that the foregoing decoding method may be modified such that a signal absence and signal presence is not provided based on the review of a single field of video signal 18, but rather based on the review of multiple fields (i.e., over a time interval). Thus, instead of a carrier presence or carrier absence provided at step 736 and step 736, detector 13 receives an indication of fields with modulated signal 22 and fields with video signal 18, and thereafter at a decision point determines if the number of fields with modulated signal 22 exceeds a threshold. If yes, then detector 13 reproduces a carrier presence for the time interval, and if no detector 13 reproduces a carrier absence for the time interval.

Figure 22:
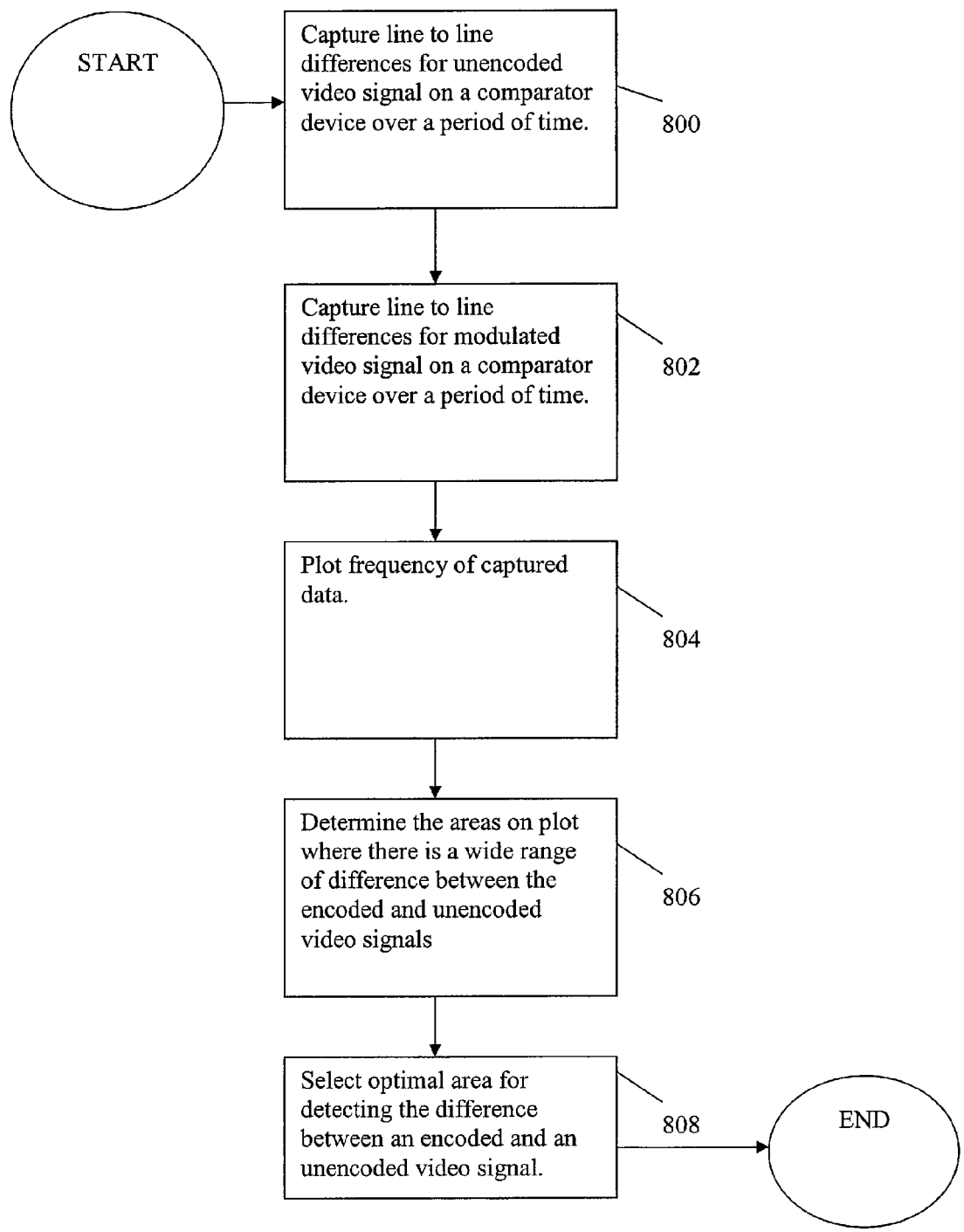
FIG. 22 is a flowchart of a method of calculating an in-range value according to an example embodiment.

Referring to FIG. 22, the method for generating the in-range by use of a comparator is shown at step 800 to first comprise the comparator capturing line to line differences of modulated video signal 22 for a time interval as described above. Preferably, comparator has the technology of detector 13 except that it processes and retains the various signals differently than detector 13 so as to provide the necessary functionality to analyze video signal 18 to determine the optimal area for detecting the difference between modulated video signal 22 and an unencoded video signal 18. Further, the time interval that comparator gathers its data is preferably at least five to ten minutes, but may be much greater as desired for increased accuracy and greater data.

Figure 23:
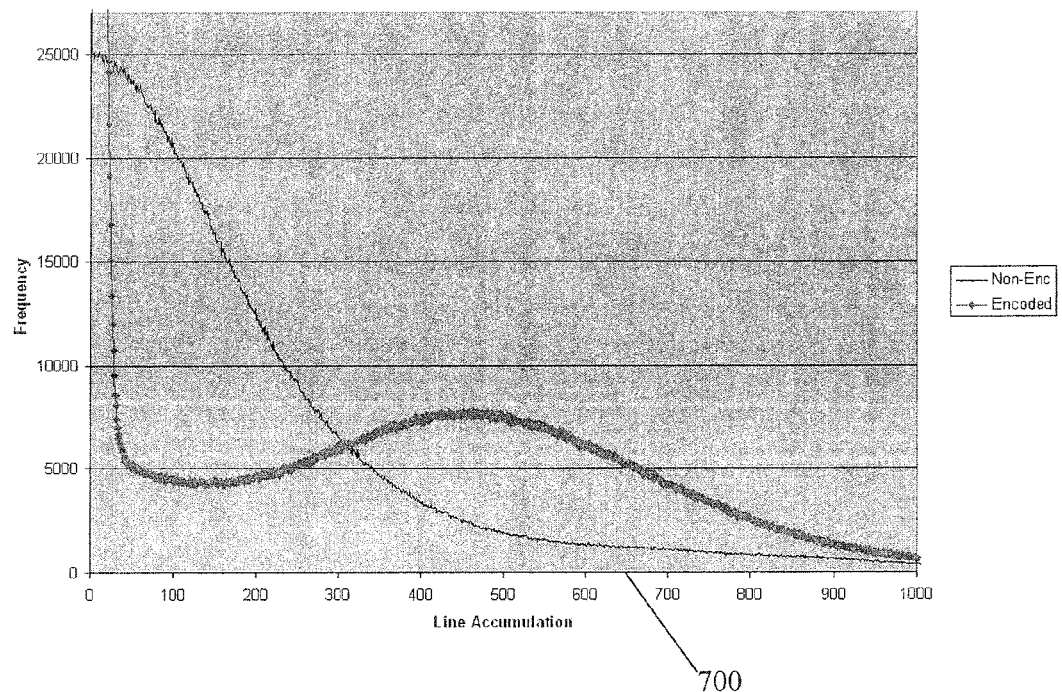
FIG. 23 is a first histogram of a method of generating an in-range value according to an example embodiment.

Comparator at step 802 captures the line to line differences of modulated video signal 22 over a time interval. Preferably, the time interval of steps 800 and 802 are nearly the same. Thereafter, at step 804, comparator generates a plot 700 of the frequency of the captured data of modulated video signal 22 and unmodulated video signal 18 as shown in FIG. 23. Thereafter, operator 16 of comparator determines the areas on the plot (e.g., as shown in FIG. 23) where there is a wide range of difference between the modulated video signal 22 and unmodulated video signal 18.

Figure 24:
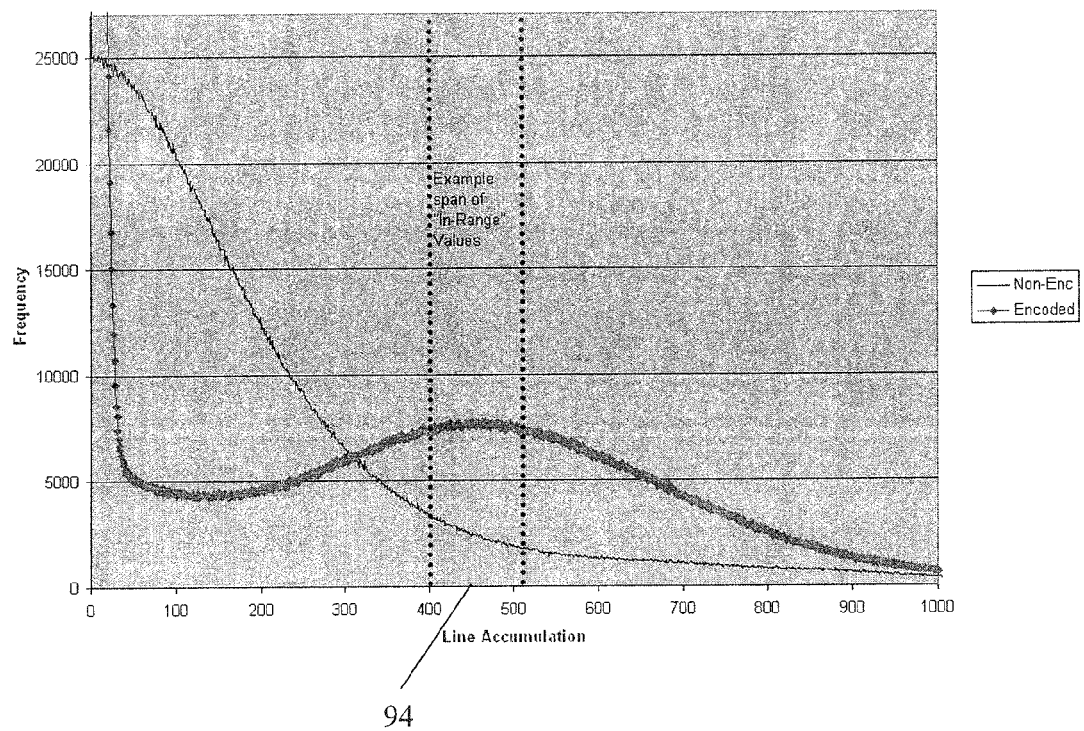
FIG. 24 is a second histogram of a method of generating an in-range value according to an example embodiment.

At step 808, operator 16 determines an optimal area for detecting the difference between modulated video signal 22 and unmodulated video signal 18. This range is designated as in-range 96 as shown in FIG. 24.

In a further alternate embodiment, the number of fields which have a sufficient number of in-range differences by either of the previously discussed alternate embodiments are compared relative to the number of fields considered during a time interval, and if the percentage or total number of fields that have a sufficient number are present during the time interval then carrier signal 22 is considered present by detector 13 during the time interval as the magnitude of the in-range differences is sufficient.

Figure 25:
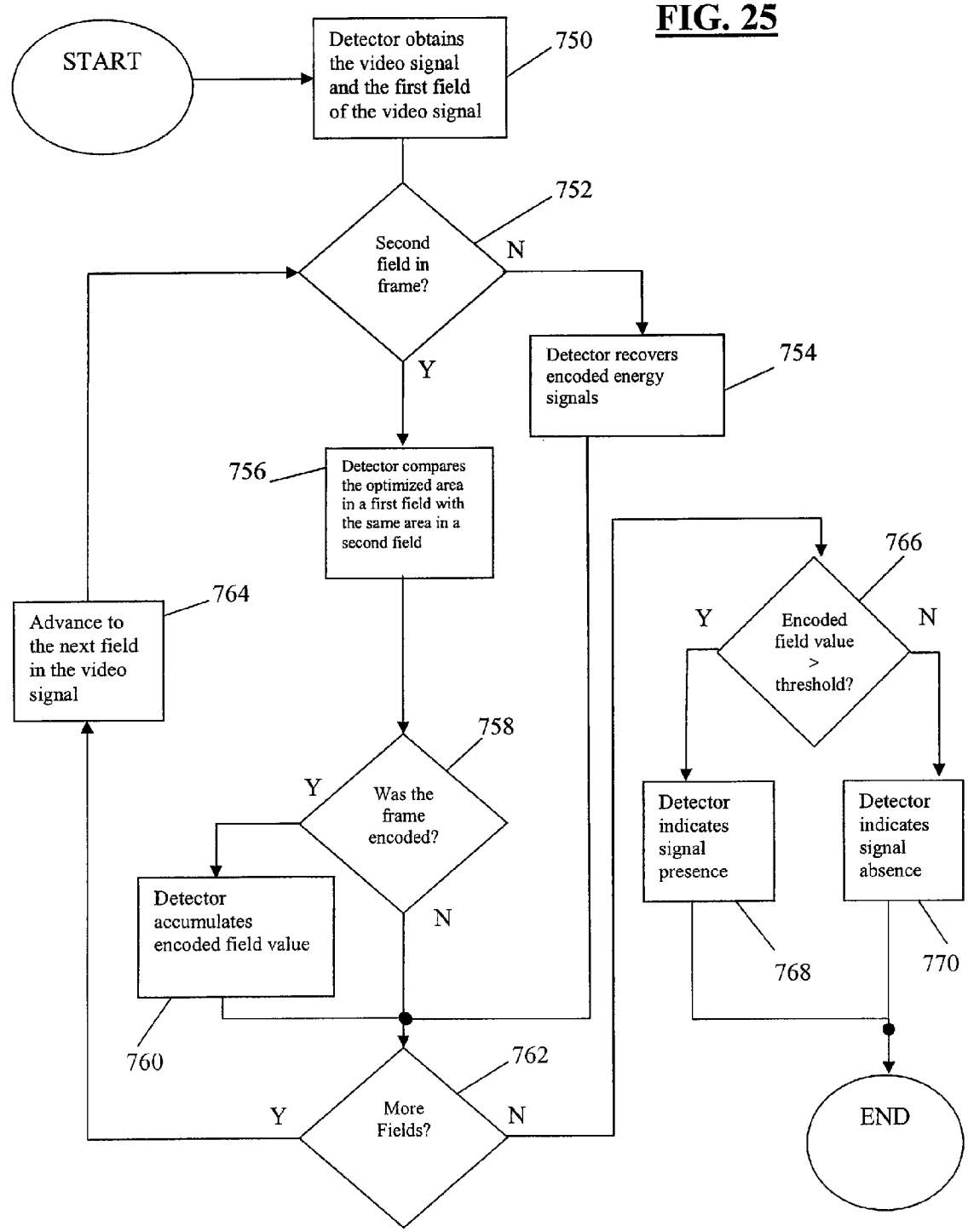
FIG. 25 is a flowchart of a third decoding method according to an example embodiment.

Referring to FIG. 25, another method of detecting carrier signal 20 is shown to first comprise a step 750 where detector 13 obtains and reads the first field of video signal 18. Thereafter, detector 13 at decision point 752 determines if the current field is the second field of the current frame of video signal 18. If no, detector 13 at step 754 calculates and stores the energy encoded by the signal hiding optimization method described above and thereafter proceeds to decision point 762. If yes, detector 13 at step 756 compares the optimized encoding area of the first field with the same area in a second field to determine whether the frame of video signal 18 was encoded.

Upon completion of step 756, detector 13 at decision point 758 determines if the frame is encoded. If yes, detector 13 accumulates the encoded energy in an encoded field value and proceeds to decision point 762. If not, detector 13 proceeds directly to decision point 762.

Detector 13 at decision point 762 determines if there are more fields to consider during the time interval. If yes, detector 13 advances to the next field in video signal 18 at step 764 and returns to decision point 752. If no, detector 13 proceeds to decision point 766.

If the time interval is complete at decision point 762, detector 13 at decision point 766 determines whether the encoded field value is greater than a detection threshold. If the encoded field value is not greater, then carrier signal 22 is not present in video signal 18 and signaled device 24 at step 770 receives a signal absence. If the signal strength is greater, then signaled device 24 at step 768 receives a signal presence.

Figure 26:
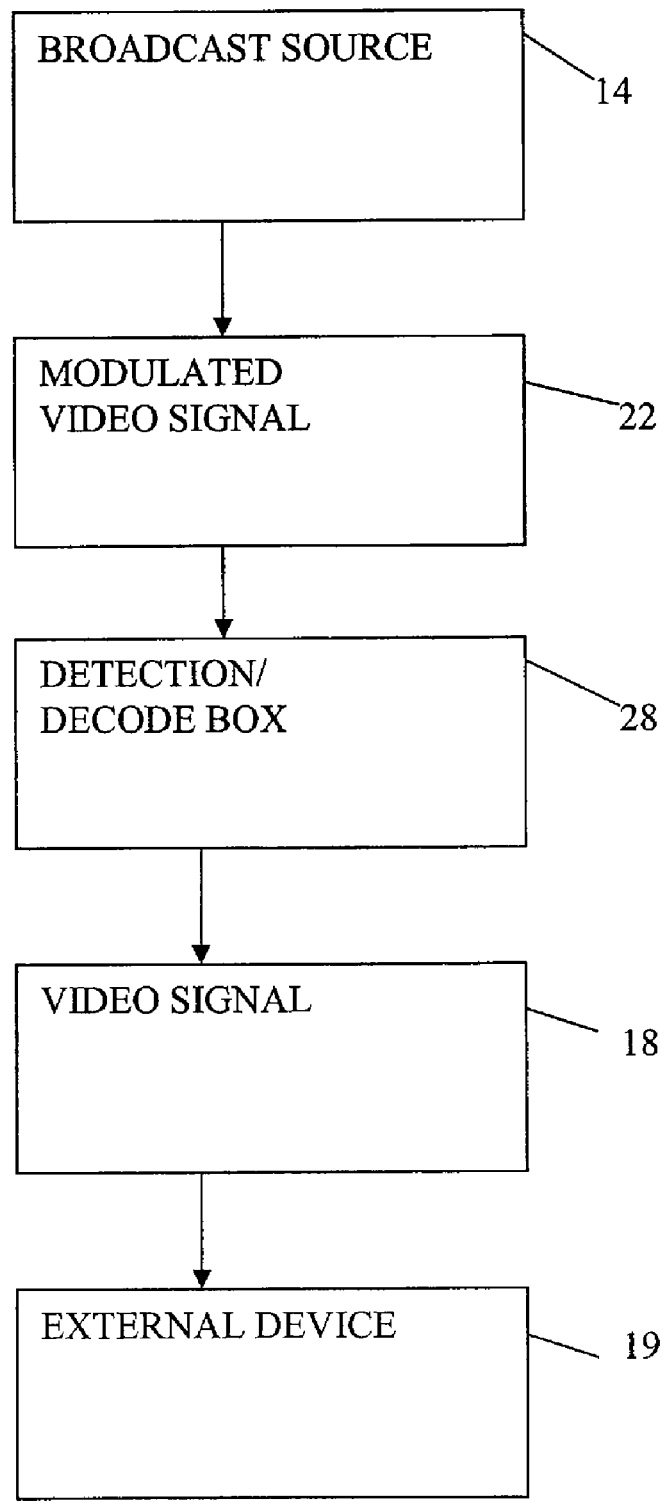
FIG. 26 is a flowchart of the detection method according to an example embodiment.

Referring to FIG. 26, the components in a system for detecting the line to line differences in scan lines is shown to first comprise broadcast source 14 transmitting a modulated video signal 22 to detection/decode box 28. As further described below, detection/decode box 28 determines the line to line differences and preferably removes carrier signal 20 from modulated video signal 22 by evening the intensities of the pixels of the scan lines of modulated video signal 22. Thereafter, detection/decode box 28 provides unencoded video signal 18 to an external device 19 under the direction of the user of detection/decode box 28. Alternatively, detection/decode box 28 may not output unencoded video signal 18 but may instead incorporate a data output that transmits the line to line differences and/or other data to a device under the direction of the user of detection/decode box 28 for the ultimate purpose of removing carrier signal 20 from modulated video signal 22. Thus, detection/decoder box 28 operates differently with the present invention as it is not attempting to receive a signal presence or signal absence but is rather attempting to utilize modulated video signal 22 as though it was unmodulated video signal 18.

Figure 27:
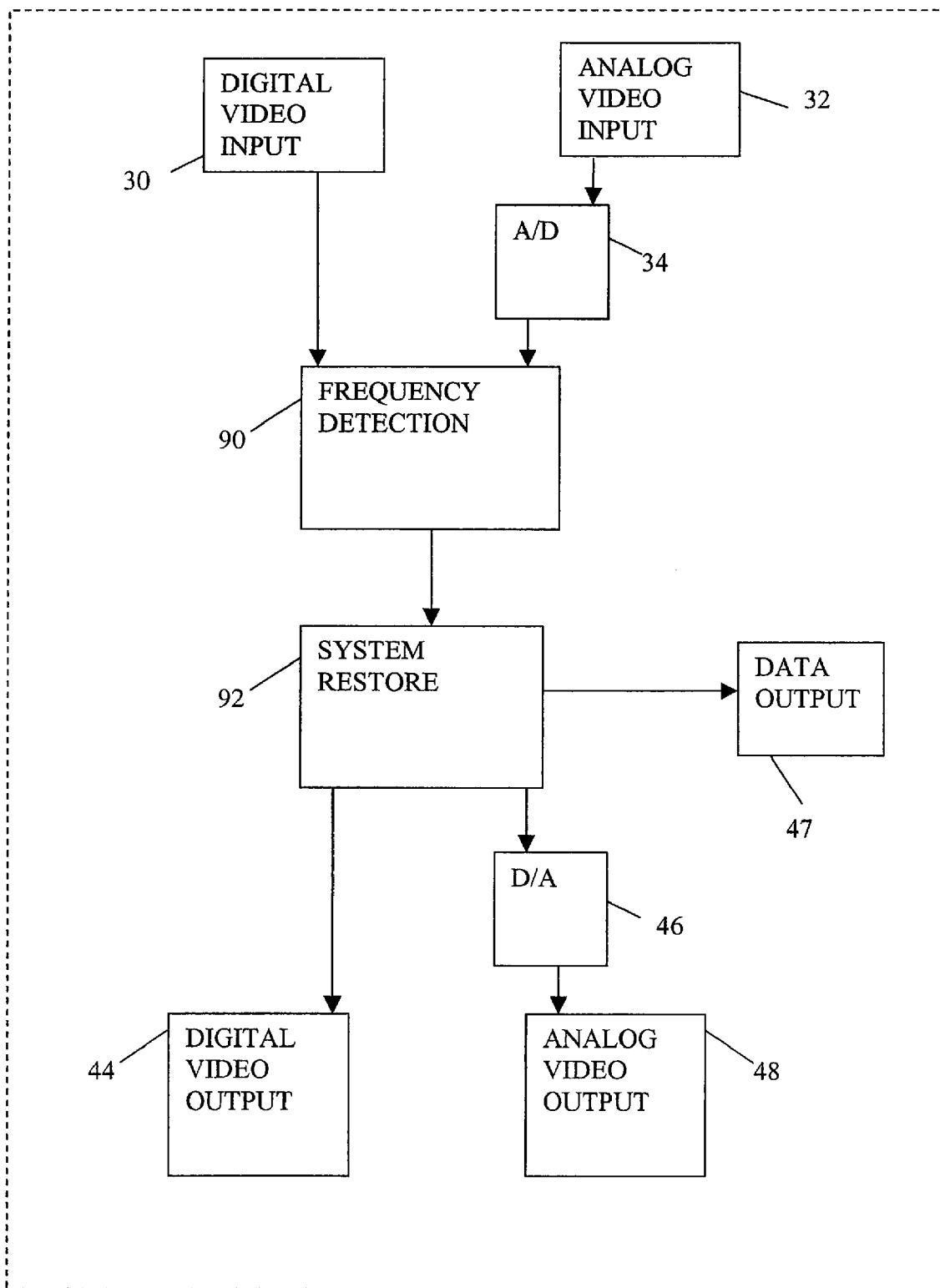
FIG. 27 is a block diagram of the detection/decoder box according to an example embodiment.

Referring to FIG. 27, detection/decoder box 28 receives modulated video signal 22 by analog video input 32 when signal 22 is analog, and by digital video input 30 when signal 22 is digital. Digital video input 30 directly passes modulated video signal 22 to frequency detection 90, while analog video input 32 digitizes modulated video signal 22 by use of analog to digital converter 34 before passing modulated video signal 22 to frequency detection 90.

Frequency detection 90 detects one or more frequencies in modulated video signal 22 that result from modulating carrier signal 20 in video signal 18. Optional system restore circuit 92 respectively adds or subtracts the inverse of the voltage added or subtracted to the respective pixels of up lines or the down lines of modulated video signal 22 so as to negate the presence of carrier signal 20 in modulated video signal 22. As an alternative, detection/decoder box 28 may further comprise a data output 47 that provides the line to line differences to external device 19.

The resulting unmodulated video signal 18 is then sent digitally from system restore 92 by digital video output 44, or in analog form by converting the resulting digital signal with digital to analog converter 46 and outputting unmodulated video signal 18 by analog video output 48. It should be appreciated that the resulting unmodulated video signal 18 may not be identical (i.e., as high of quality) to the original video signal 18, but program presented by the resulting unmodulated video signal 18 should be nearly identical.

Figure 28:
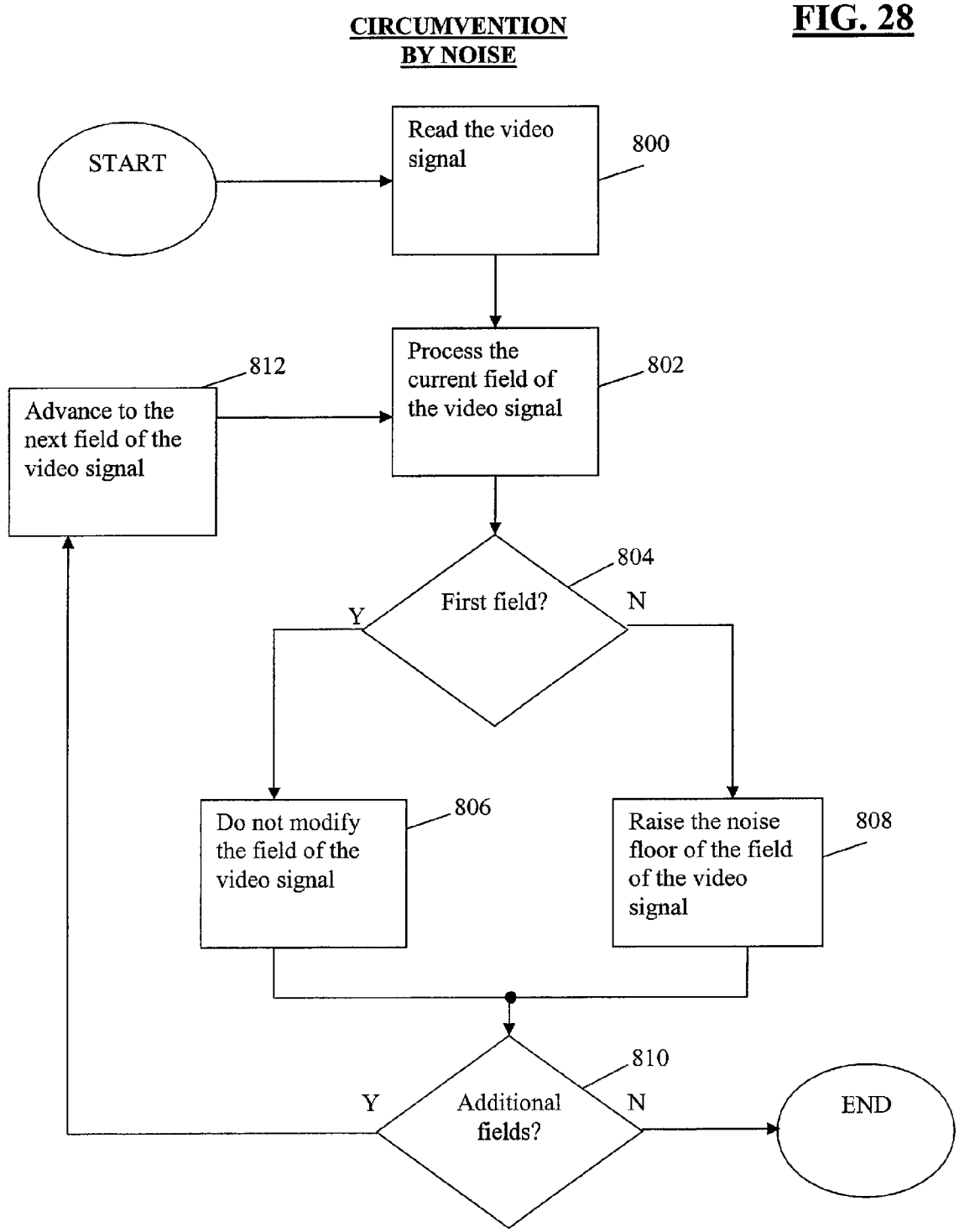
FIG. 28 is a flowchart of a first circumvention method according to an example embodiment.

Referring to FIG. 28, a first circumvention method of the present invention comprises a first step 800 where a circumvention device reads video signal 18 from broadcast source 14 and initializes a pointer to the first field of video signal 18. Thereafter, the circumvention device at step 802 processes the current field of video signal 18.

The circumvention device at step 804 determines if the current field is the first field of the frame of video signal 18. If yes, the circumvention device does not alter video signal 18 at step 806 and proceeds to decision point 810. If no, the circumvention device raises the noise floor of the second field of video signal 18 at step 808 and proceeds to decision point 810.

The circumvention device at step 810 determines if there are additional fields in video signal 18. If yes, the circumvention device at step 812 advances to the next field of video signal 18 and returns to step 802. If no, the process for circumventing the present invention by raising the noise floor is complete.

Figure 29:
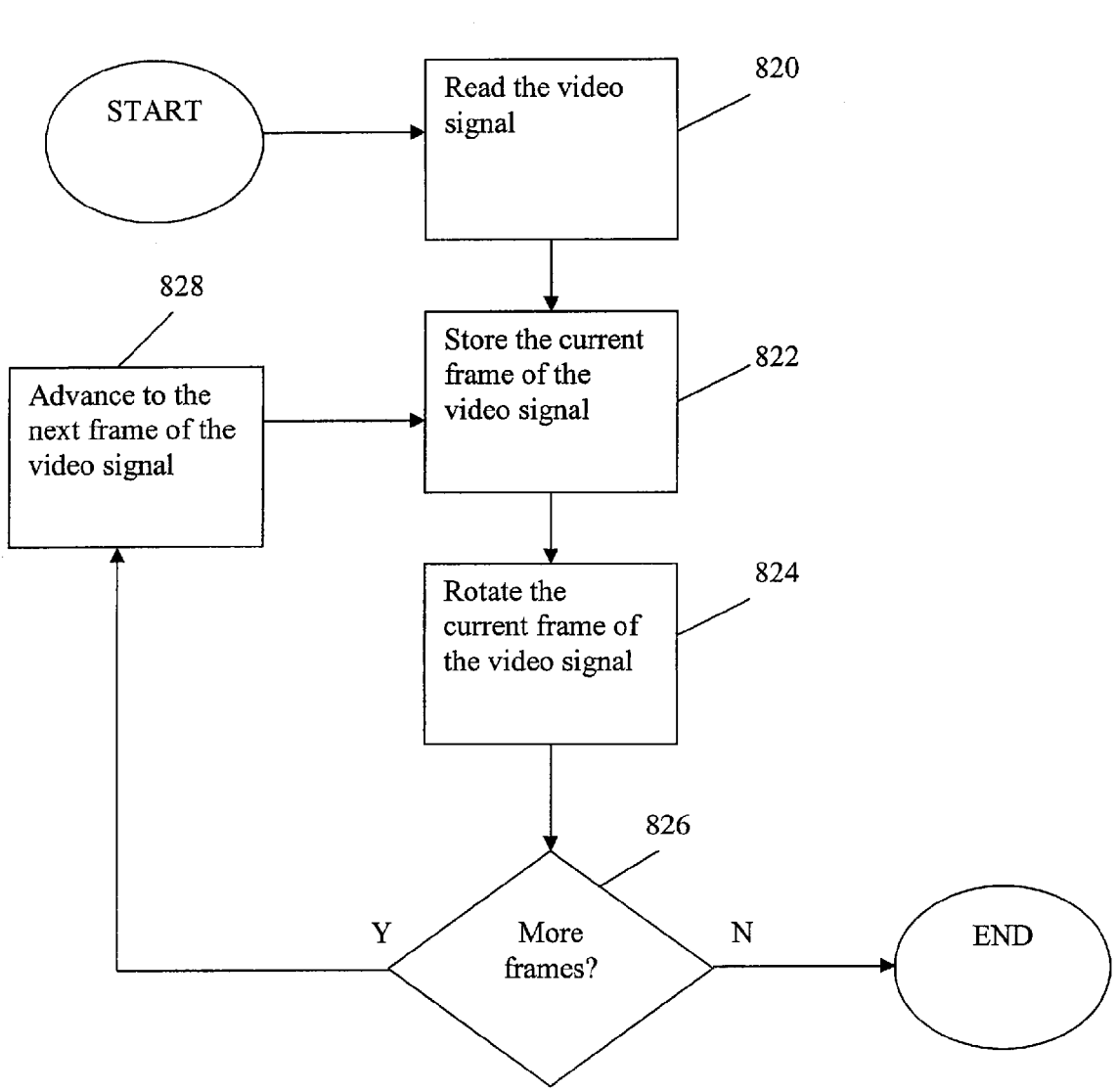
FIG. 29 is a flowchart of a second circumvention method according to an example embodiment.

Referring to FIG. 29, a second circumvention method of the present invention comprises a first step 820 where the circumvention device reads video signal 18 and initializes a pointer to the first frame of video signal 18. Thereafter, at step 822, the circumvention device stores the current frame of video signal 18. The circumvention device then rotates the current frame of video signal 18 around the Z-axis.

The circumvention device at step 826 determines if there are additional frames in video signal 18. If yes, the circumvention device at step 828 advances to the next frame of video signal 18 and returns to step 822. If no, the process for circumventing the present invention by raising the rotating the frames of the video signal is complete.

In an alternate embodiment of the foregoing process, only frames that are determined to have been modulated with carrier signal 20 are rotated.

It should be understood from the foregoing that, while particular embodiments of the invention have been illustrated and described, various modifications can be made thereto without departing from the spirit and scope of the invention. Therefore, it is not intended that the invention be limited by the specification; instead, the scope of the present invention is intended to be limited only by the appended claims.

What is claimed is:

1. A method for signal modulation comprising:
   selecting a plurality of pixels within one or more frames of a video signal in a pattern such that a first pixel group of the plurality of pixels is unpaired with a second pixel group of the plurality of pixels throughout the pattern; and
   determining adjustment amounts to the first pixel group and the second pixel group according to at least one signal hiding technique; and
   altering intensity of the first pixel group and the second pixel group according to the adjustment amounts.

2. The method of claim 1, wherein determining adjustment amounts to the first pixel group according to at least one signal hiding technique includes:
   determining adjustment amounts to a plurality of pixels for a first pixel group by selecting a largest adjustment value for each of the plurality of pixels determined by at least two signal hiding techniques.

3. The method of claim 1, wherein altering intensity of the plurality of the pixels of the first pixel group and the second pixel group according to the adjustment amounts includes:
   altering intensity of the plurality of the pixels of the first pixel group and the second pixel group according to a random or pseudo-random portion of the adjustment amounts.

4. A method for signal modulation comprising:
   selecting a plurality of pixels in a pattern such that a first pixel group of the plurality of pixels is unpaired with a second pixel group of the plurality of pixels throughout the pattern in a portion of a video signal; and
   altering intensity of the plurality of the pixels at a constant magnitude in the portion of the video signal pursuant to the pattern in a substantially invisible way.

5. The method of claim 4, further comprising selecting a varied pattern of high and low changes as a pattern.

6. The method of claim 4, wherein altering luminance of a plurality of the pixels includes at least one of selectively adding or removing luminance to the plurality of pixels.

7. The method of claim 4, further comprising selecting a pattern wherein the first group of the plurality of pixels are not in a high/low configuration with the second group of the plurality of pixels.

8. The method of claim 4, further comprising receiving a video signal from a signal source.

9. The method of claim 4, wherein the video signal includes an analog video signal.

10. The method of claim 4, wherein the portions include one or more frames of the video signal.

11. The method of claim 10, wherein the one or more frames of the video signal includes one or more consecutive frames of the video signal.

12. The method of claim 4, wherein the portions include a field of one or more frames of the video signal.

13. The method of claim 11, wherein the field of the one or more frames includes a same field of the one or more frames.

14. The method of claim 4, further comprising providing the video signal including a carrier signal to a broadcast source.

15. The method of claim 4, further comprising providing a resulting modulated video signal to a broadcast source.

16. The method of claim 4, further comprising selecting an irregular configuration as a pattern.

17. The method of claim 4, wherein the pattern creates an amount of high/low and low/high changes in the field that makes an intensity alteration to the plurality of pixels detectible.

18. The method of claim 4, wherein the pattern creates an amount of line to line differences with a plurality of pairs of adjacent scan lines in the field that makes an intensity alteration to the plurality of pixels detectible.

19. The method of claim 4, further comprising selecting a pseudorandom pattern as a pattern.

20. The method of claim 1, wherein the first pixel group includes selection of a first number of scan lines of a field and the second pixel group includes a second number of scan lines of the field that is different than the first number of scan lines.

21. An encoding system comprising:
a signal source; and
an encoder configured to:
receive a video signal from the signal source,
designate a pixel group in a field of one or more frames of the video signal in a pattern such that the plurality of scan lines are not paired throughout the field, and
alter intensity of a plurality of the pixels of the designated pixel group at a constant magnitude pursuant to the pattern in a substantially invisible way.

22. The system of claim 21, wherein the pixel group includes a plurality of scan lines.

23. An encoding apparatus comprising:
a processor; and
software means on the processor operative for:
selecting a plurality of scan lines in a field of one or more frames in a pattern such that the plurality of scan lines are not paired throughout the field, and
altering luminance of a plurality of the pixels of the plurality of scan lines at a constant magnitude pursuant to the pattern in a substantially invisible way.

24. An encoding apparatus comprising:
means for selecting a plurality of scan lines in a field of one or more frames in a pattern such that the plurality of scan lines are not paired throughout the field; and
means for altering luminance of a plurality of the pixels of the plurality of scan lines at a constant magnitude pursuant to the pattern in a substantially invisible way.

25. A tangible medium comprising:
a plurality of frames; and
a plurality of scan lines of a field of at least one of the plurality of frames comprising a plurality of pixels with substantially invisible luminance adjustments according to a pattern where the plurality of scan lines are not paired throughout the field, wherein luminance of the plurality of the pixels of the plurality of scan lines is adjusted at a constant magnitude.

26. An encoding system comprising:
an encoder; and
a broadcast source, the broadcast source receiving a modulated video signal from the encoder, the video signal comprising:
a plurality of frames, and
a plurality of scan lines of a field of at least one of the plurality of frames comprising a plurality of pixels with substantially invisible luminance adjustments according to a pattern where the plurality of scan lines are not paired throughout the field, wherein luminance of the plurality of the pixels of the plurality of scan lines is adjusted at a constant magnitude.

* * * * *